United States Patent
Yu et al.

(10) Patent No.: US 11,560,152 B2
(45) Date of Patent: Jan. 24, 2023

(54) METHOD AND SYSTEM FOR CONTROLLING MOVEMENTS OF AN AUTONOMOUS VEHICLE WITH SELF DIAGNOSIS CAPABILITY

(71) Applicant: Automotive Research & Testing Center, Lugong (TW)

(72) Inventors: Chien-Hung Yu, Lugong (TW); Jin-Yan Hsu, Lugong (TW); Tong-Kai Jhang, Lugong (TW); Chi-Chun Huang, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 273 days.

(21) Appl. No.: 17/132,862

(22) Filed: Dec. 23, 2020

(65) Prior Publication Data

US 2022/0194414 A1     Jun. 23, 2022

(51) Int. Cl.
*B60W 60/00*     (2020.01)
*B60W 10/20*     (2006.01)
(Continued)

(52) U.S. Cl.
CPC .......... *B60W 60/001* (2020.02); *B60W 10/08* (2013.01); *B60W 10/18* (2013.01);
(Continued)

(58) Field of Classification Search
CPC .... B60W 60/001; B60W 10/08; B60W 10/18; B60W 10/20; B60W 10/26; B60W 30/02; B60W 40/068; B60W 40/072; B60W 40/101; B60W 40/107; B60W 40/109; B60W 2520/10; B60W 2520/125; B60W 2520/26
(Continued)

(56) References Cited

U.S. PATENT DOCUMENTS 7,171,296 B2 *   1/2007   Kato ..................... B60W 10/18 701/87
7,689,392 B2 *   3/2010   Boyd ..................... G09B 9/048 703/8

(Continued)

FOREIGN PATENT DOCUMENTS

CN    108791491 A     11/2018
CN    110466359 A *   11/2019  ............. B60L 15/20
(Continued)

*Primary Examiner* — B M M Hannan
(74) *Attorney, Agent, or Firm* — Birch, Stewart, Kolasch & Birch, LLP

(57) ABSTRACT

A method for controlling movement of an autonomous vehicle includes: estimating a set of tire force margins with respect to each wheel of the vehicle and a set of dynamic chassis margins associated with a chassis module of the vehicle; based on the margins, determining whether the vehicle is capable of moving in accordance with a decision command; when the determination is negative, outputting a request for update of the decision command; and when an updated decision command has not been received, calculating a set of marginal actuating signals based on the decision command, the margins, required slip angles respectively for the wheels and a center of percussion of the vehicle so as to make the autonomous vehicle move accordingly.

20 Claims, 15 Drawing Sheets

(51) Int. Cl.
*B60W 30/02* (2012.01)
*B60W 10/08* (2006.01)
*B60W 10/18* (2012.01)
*B60W 10/26* (2006.01)
*B60W 40/068* (2012.01)
*B60W 40/072* (2012.01)
*B60W 40/107* (2012.01)
*B60W 40/109* (2012.01)
*B60W 40/101* (2012.01)

(52) U.S. Cl.
CPC ............ *B60W 10/20* (2013.01); *B60W 10/26* (2013.01); *B60W 30/02* (2013.01); *B60W 40/068* (2013.01); *B60W 40/072* (2013.01); *B60W 40/101* (2013.01); *B60W 40/107* (2013.01); *B60W 40/109* (2013.01); *B60W 2520/10* (2013.01); *B60W 2520/125* (2013.01); *B60W 2520/26* (2013.01)

(58) Field of Classification Search
USPC ........................................................... 701/22
See application file for complete search history.

(56) References Cited

U.S. PATENT DOCUMENTS

| | | | |
|---|---|---|---|
| 7,698,043 B2 | 4/2010 | Ono | |
| 10,168,252 B1* | 1/2019 | Zeng | ..................... G01M 17/02 |
| 10,919,520 B1* | 2/2021 | Gadda | ................... B60W 10/04 |
| 2009/0228174 A1* | 9/2009 | Takagi | ................ B60T 8/17558 |
| | | | 701/41 |
| 2010/0055649 A1* | 3/2010 | Takahashi | ........... B60W 50/082 |
| | | | 434/66 |
| 2010/0077847 A1* | 4/2010 | Joe | ......................... G01M 17/02 |
| | | | 73/146 |
| 2013/0138318 A1 | 5/2013 | Choby | |
| 2017/0166215 A1 | 6/2017 | Rander | |
| 2019/0256094 A1* | 8/2019 | Kasaiezadeh Mahabadi ............... | |
| | | | B60W 30/182 |
| 2021/0253118 A1* | 8/2021 | Wang | ................... B60W 60/001 |

FOREIGN PATENT DOCUMENTS

| | | | | |
|---|---|---|---|---|
| CN | 113353003 A | * | 9/2021 | ........... B60R 16/023 |
| CN | 114368369 A | * | 4/2022 | .......... B60T 8/17551 |
| TW | 375583 B | | 12/1999 | |
| TW | I672235 B | | 9/2019 | |

* cited by examiner

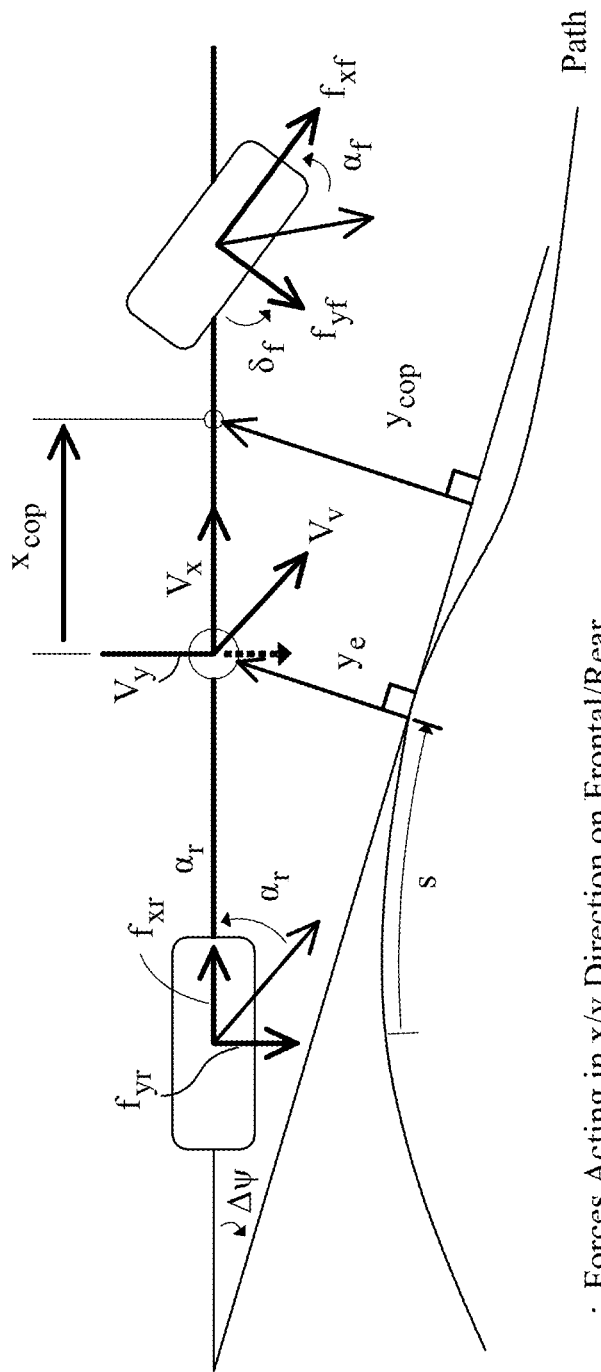

$F_{xf,yf,xr,yr}$ : Forces Acting in x/y Direction on Frontal/Rear Wheel
$\alpha_{f,r}$ : Frontal/Rear Wheel Slip Angle
$V_{x,y}$ : Longitudinal/Lateral Speed
$V_v$ : Vehicle Speed (Composite of $V_v$, $V_y$)
$Y_e$ : Distance from Vehicle Center of Gravity (CoG) to Target
Path (Defined Trajetory Curve)
COP : Center of Percussion
$X_{cop}$ : Distance from CoG to COP
$Y_{cop}$ : Distance from COP to Target Path
S : Arc length

FIG.9

METHOD AND SYSTEM FOR CONTROLLING MOVEMENTS OF AN AUTONOMOUS VEHICLE WITH SELF DIAGNOSIS CAPABILITY

FIELD

The disclosure relates to a method and a system for chassis control, and more particularly to a method and a system for controlling movements of an autonomous vehicle.

BACKGROUND

As the development of autonomous vehicles (also known as self-driving car) advances, a number of ways of plotting a path for self driving have been devised. As defined by SAE international (the Society of Automotive Engineers), a commercial vehicle may be operated in one of six levels (from level 0, which is fully manual (i.e., no driving automation) and requires manual control by human, meaning the dynamic driving task is performed by human, to level 5, which is full driving automation and does not require human attention). In the advanced vehicles (e.g., level 3 to level 5, which may be referred to as autonomous vehicles), plotting for a route may require more considerations in various aspects (e.g., objects around the vehicle, condition of the road, etc.). A plotted route is converted into a number of commands to be sent to a vehicle controller unit of the autonomous vehicle for execution. However, a conventional autonomous vehicle may not have the ability to carry out some of the commands (e.g., a sharp turn, an abrupt brake, etc.), and therefore, actual movement of the autonomous vehicle may diverge from the plotted route. Additionally, some of the commands may result in discomfort for people sitting in the vehicle (e.g., a driver, a passenger, etc.).

SUMMARY

Therefore, an object of the disclosure is to provide a method that can alleviate at least one of the drawbacks of the prior art.

According to one embodiment of the disclosure, a method for controlling movement of an autonomous vehicle is provided. The autonomous vehicle includes a chassis, a dynamic driving system, an information platform, a decision module, a chassis control module and an actuator controller module. The dynamic driving system includes a plurality of wheels, a motor, a steering sub-system, a power source controller and a brake sub-system that are mounted on the chassis of the autonomous vehicle.

The information platform includes multiple sets of sensors with each set of sensors being disposed on a respective one of different parts of the autonomous vehicle where the different parts including the wheels. The sets of sensors are configured to obtain a plurality of driving datasets while the autonomous vehicle is moving. The decision module is configured to compute and generate a decision command for steering the autonomous vehicle. The chassis control module is coupled to the information platform and the decision module. The actuator controller module is coupled to the chassis control module and the dynamic driving system. The method includes:

a) executing, by the chassis control module, a margin estimation operation to estimate a set of tire force margins with respect to each of the wheels, a set of dynamic chassis margins based on the plurality of driving datasets, and a set of capable performances of the dynamic driving system;

b) in response to receipt of a decision command from the decision module, calculating, by the chassis control module, a set of required performances associated with the decision command and determining whether the autonomous vehicle is capable of moving in accordance with the decision command;

c) when it is determined that the autonomous vehicle is capable of moving based on the decision command, by the chassis control module, calculating a set of actuating signals based on the decision command, and outputting the set of actuating signals to the actuator controller module so as to enable the actuator controller module to actuate the dynamic driving system to move the autonomous vehicle in accordance with the decision command;

d) when it is determined that the autonomous vehicle is not capable of moving in accordance with the decision command, outputting, by the chassis control module, a request for adjustment of the decision command to the decision module; and e) when an adjusted decision command has not been received by the chassis control module within a pre-determined time period after step d), by the chassis control module, estimating a required slip angle for each of the wheels, and calculating a set of marginal actuating signals based on the sets of tire force margins for the wheels, the set of dynamic chassis margins, the required slip angle for each of the wheels and a center of percussion (COP) of the autonomous vehicle, and outputting the set of marginal actuating signals to the actuator controller module so as to enable the actuator controller module to actuate the dynamic driving system to move the autonomous vehicle in accordance with the marginal actuating signals.

Another object of the disclosure is to provide a chassis control module that is configured to perform the above-mentioned method.

According to one embodiment of the disclosure, a chassis control module for controlling a movement of an autonomous vehicle is provided. The autonomous vehicle includes a chassis, a dynamic driving system, an information platform, a decision module, the chassis control module and an actuator controller module.

The dynamic driving system includes a plurality of wheels, a motor, a steering sub-system, a power source controller and a brake sub-system that are mounted on the chassis of the autonomous vehicle. The information platform includes, for each of the wheels and different parts of the autonomous vehicle, a set of sensors disposed thereon. The sets of sensors are configured to obtain a plurality of driving datasets while the autonomous vehicle is moving. The decision module is configured to compute and generate a decision command for steering the autonomous vehicle. The chassis control module is coupled to the information platform and the decision module. The actuator controller module is coupled to the chassis control module and the dynamic driving system. The chassis control module includes:

a dynamic margin identifier programmed to, in response to receipt of the plurality of driving datasets obtained by the information platform while the autonomous vehicle is moving, execute a margin estimation operation to estimate a set of tire force margins with respect to each of the wheels and a set of dynamic chassis margins based on the plurality of driving datasets, and a set of capable performances of the dynamic driving system; and an integrated controller connected to the dynamic margin identifier and programmed to in response to receipt of the decision command from the decision module, calculate a set of required performances associated with the decision command and determine whether the autonomous vehicle is capable of moving in accordance with the decision command, and when it is determined that the autonomous vehicle is capable of moving in accordance with the decision command, calculate a set of actuating signals based on the decision command, and output the set of actuating signals to the actuator controller module so as to enable the actuator controller module to actuate the dynamic driving system to move the autonomous vehicle in accordance with the decision command, when it is determined that the autonomous vehicle is not capable of moving in accordance with the decision command, output a request for update of the decision command to the decision module, and when an updated decision command has not been received by the integrated controller after a pre-determined time period has elapsed since the request was outputted, estimate a required slip angle for each of the wheels, and calculate a set of marginal actuating signals based on the decision command, the set of dynamic chassis margins, the required slip angles respectively for the wheels and a center of percussion (COP) of the autonomous vehicle, and output the set of marginal actuating signals to the actuator controller module so as to enable the actuator controller module to actuate the dynamic driving system to move the autonomous vehicle based on the marginal actuating signals.

BRIEF DESCRIPTION OF THE DRAWINGS

Other features and advantages of the disclosure will become apparent in the following detailed description of the embodiments with reference to the accompanying drawings, of which:

FIG. 9 is a control block diagram illustrating operations for controlling the movement of the autonomous vehicle in a marginal mode.

DETAILED DESCRIPTION

Figure 1:
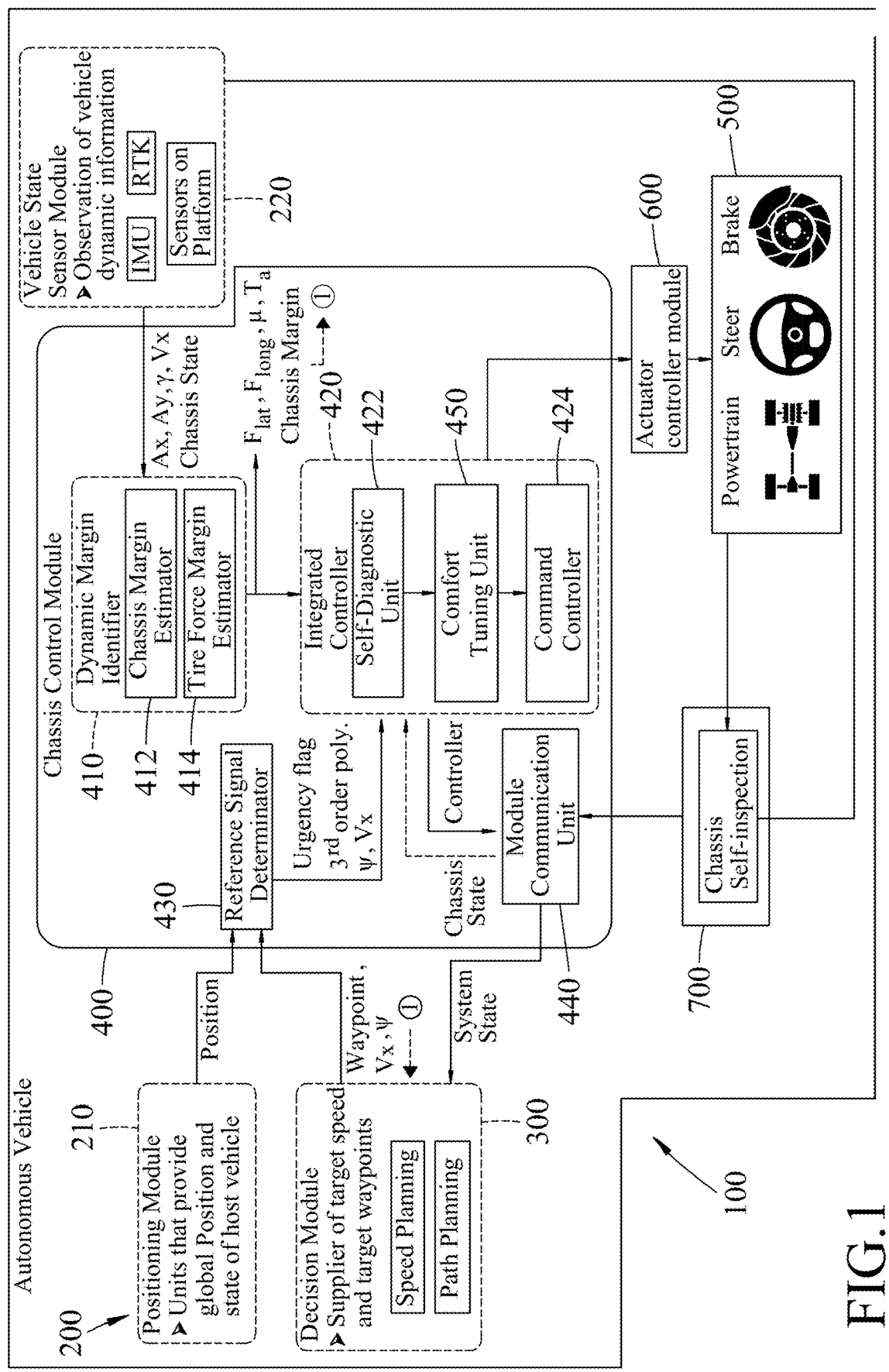
FIG. 1 is a block diagram illustrating components of an autonomous vehicle according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/device/equipment, a number of wired connection technologies such as CAN (Campus Area Networks), LAN (Local Area Networks) or Ethernet, or wireless communication.

FIG. 1 is a block diagram illustrating components of an autonomous vehicle 100 according to one embodiment of the disclosure. In this embodiment, the autonomous vehicle 100 may be configured to operate in an autonomous manner (e.g., SAE levels 3 to 5), as classified by SAE international. The SAE classifications are shown in the following Table 1.

TABLE 1

| SAE level | Term | Description |
| --- | --- | --- |
| 0 | None | The driver is in control, and the system provides warnings and momentarily intervenes. |
| 1 | Hands on | The system provides speed and steering control, and the driver provides all other controls. |
| 2 | Hands off | The system provides basic controls, and the driver stands by in preparation to intervene in need. |
| 3 | Eyes off | The driver may be required to provide some controls in response to requests from the system, but otherwise the system provides all controls. |
| 4 | Mind off | Limited in specific areas, no human intervention is required while moving. |
| 5 | Steering wheel optional | No human intervention is required at all as the system handles all issues on the road and ambient environment. |

The autonomous vehicle 100 in this embodiment includes an information platform 200, a decision module 300, a chassis control module 400, a dynamic driving system 500, and a chassis self-inspection module 700.

The dynamic driving system 500 includes a plurality of wheels (not shown), a motor (not shown), a steering sub-system (not shown), a power source controller (not shown) and a brake sub-system (not shown). Each of the wheels includes a circular frame (not shown) and a tire mounted on the circular frame (not shown). The sub-systems and components of the dynamic driving system 500 are mounted on a chassis (not shown) of the autonomous vehicle 100, and are collectively known as a chassis module. In some embodiments, the motor is contained in the steering sub-system and the power source controller.

The steering sub-system may be embodied using a steering wheel (not shown), a rack (not shown) for directing front wheels (not shown), a steering column (not shown) and a steering shaft (not shown) connected between the steering wheel and the rack, and a steering motor (not shown) for driving the rack when the autonomous vehicle 100 operates in the autonomous manner. The steering motor may be embodied using an electric power steering (EPS) module. In cases that the autonomous vehicle 100 supports operations of SAE level 4 or 5, the steering wheel, the steering column and the steering shaft may be omitted. The steering sub-system may further include: a steering controller (not shown) that is configured to control the steering motor and that is embodied using a microprocessor and executable software as a set of logic instructions stored in a machine- or computer-readable storage medium of a memory such as random access memory (RAM), Electronic Control Unit (ECU), read only memory (ROM), programmable ROM (PROM), firmware, flash memory, etc.; configurable logic such as programmable logic arrays (PLAs), field programmable gate arrays (FPGAs), complex programmable logic devices (CPLDs), etc.; fixed-functionality logic hardware using circuit technology such as application specific integrated circuit (ASIC), complementary metal oxide semiconductor (CMOS), transistor-transistor logic (TTL) technology, etc.; or any combination thereof.

For example, the microprocessor may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The power source controller may be embodied using a motor controller (not shown) for controlling the motor, and an accelerator pedal (not shown) connected to the motor controller for sending an acceleration request (i.e., electric motor power demand) to the motor controller in response to user operation. In some embodiments, the motor may be incorporated in the power source controller. In cases that the autonomous vehicle 100 supports the operations of SAE level 4 or 5, the accelerator pedal may be omitted. The motor controller may be embodied using a microprocessor and executable software as a set of logic instructions stored in a machine- or computer-readable storage medium of a memory, as described above.

The brake sub-system may be embodied using a plurality of brake discs (disc rotor) (not shown) interlocking respectively with the wheels, a plurality of caliper assemblies (not shown) respectively straddling the brake discs, a brake pedal (not shown) for driving the caliper assemblies to brake the brake discs, and a braking controller (not shown) configured to actuate the caliper assemblies autonomously. In cases that the autonomous vehicle 100 supports the operations of SAE level 4 or 5, the brake pedal may be omitted. The braking controller may be embodied using a microprocessor and executable software as a set of logic instructions stored in a machine- or computer-readable storage medium of a memory, as described above.

The information platform 200 is configured to obtain a plurality of driving datasets while the autonomous vehicle 100 is moving, and includes a positioning module 210 and a vehicle state sensor module 220. The positioning module 210 may be embodied in a microprocessor and executable software as a set of logic instructions stored in a machine- or computer-readable storage medium of a memory, in a manner similar to the steering sub-system as described above.

The positioning module 210 may further include a positioning component, such as a global positioning system (GPS) component. The memory of the positioning module 210 stores an electronic map and software instructions that, when executed by the microprocessor, cause the microprocessor to implement computational operations for performing simultaneous localization and mapping (SLAM) associated with the electronic map. In use, the positioning module 210 is programmed to provide information regarding the global position and states of the autonomous vehicle 100, such as a heading angle of the autonomous vehicle 100.

The vehicle state sensor module 220 includes, for each of the wheels, a set of sensors (not shown) disposed on the wheel for obtaining information regarding the wheel of the autonomous vehicle 100. In this embodiment, the vehicle state sensor module 220 further includes an inertial measurement unit (IMU) and a real-time kinematic (RTK) unit for obtaining dynamic information of the autonomous vehicle 100 while the autonomous vehicle 100 is in motion. In use, the IMU and the RTK unit may complement each other and cooperatively provide the dynamic information under various conditions. For example, when the autonomous vehicle 100 is moving in areas in which external communication maybe limited (e.g., driving in a tunnel), the RTK unit may not be able to provide the dynamic information, and the IMU will be relied upon to provide the dynamic information.

In some embodiments, the vehicle state sensor module 220 may include additional sensors (not shown) disposed on other parts of the autonomous vehicle 100 (such as the chassis, the motor, the steering sub-system, the brake sub-system, etc.) to obtain additional data such as a velocity of the autonomous vehicle 100 (by, for example, a speedometer), a gear ratio, etc.

The driving datasets obtained by the information platform 200 may include data in a variety of categories.

Figure 3:
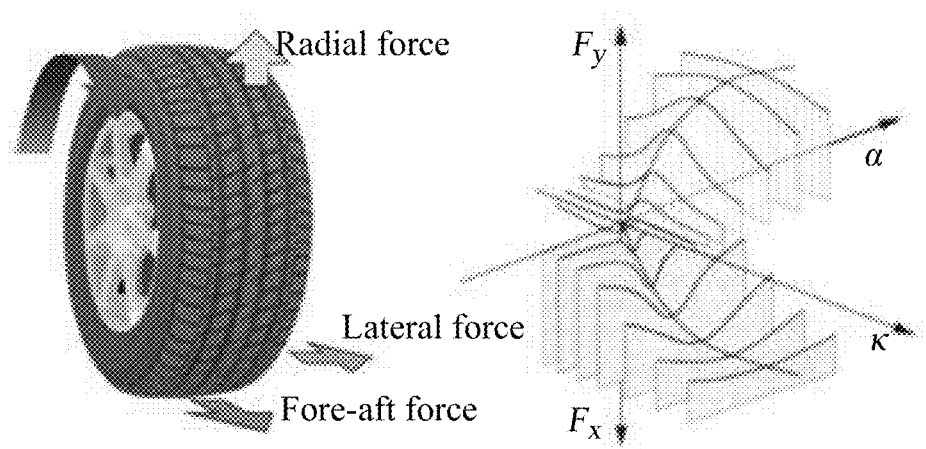
FIG. 3 is a schematic view illustrating tire forces applied to a wheel in different directions.

For each of the wheels, the sensors disposed on the corresponding wheel are configured to detect a number of specific datasets, and to subsequently obtain a number of tire forces applied to the corresponding tire in different directions based on the number of specific datasets, using estimation techniques. As shown in FIG. 3, the tire forces may include a radial force, a lateral force and a fore-aft force. In addition, the sensors may be configured to subsequently obtain friction between the wheel and ground, a torque created by the wheel, a turning angle of the wheel that is a front wheel, a wheel speed, etc., based on the number of specific datasets, using estimation techniques.

The sensors disposed on the motor are configured to detect a power that is being outputted by the motor (i.e., an EPS motor torque).

The sensors disposed on the steering sub-system are configured to detect an angular speed of the steering wheel, a turning angle of the steering wheel, etc.

The sensors disposed on the power source controller are configured to detect a speed and an acceleration of the autonomous vehicle 100, etc.

The sensors disposed on the brake sub-system are configured to detect a pressure on a brake pedal (in cases that the brake pedal is present), a brake force applied to the brake disc (disc rotor), etc.

The decision module 300 may be embodied using a microprocessor and a physical data storage (e.g., flash memory) that stores software instructions that, when executed by the microprocessor, cause the microprocessor to implement computational operations for performing speed planning and waypoint planning for the autonomous vehicle 100. Specifically, when the autonomous vehicle 100 is in an autonomous mode, the decision module 300 is configured to generate a decision command that includes a number of successive target waypoints and a target velocity for the autonomous vehicle 100 to move accordingly. The successive target waypoints may constitute a path intended for the autonomous vehicle 100 to move along. The generation of the decision command may be based on a predetermined destination, a number of objects detected by the information platform 200, or other aspects related to the autonomous vehicle 100 and/or the ambient environment.

The chassis control module 400 is coupled to the information platform 200 and the decision module 300 for receiving data therefrom, and is coupled to an actuator controller module 600 for transmitting signals thereto.

It is noted that each of the components included in the chassis control module 400 may be embodied using a microprocessor and executable software as a set of logic instructions stored in a machine- or computer-readable storage medium of a memory as described above.

In this embodiment, the chassis control module 400 includes a dynamic margin identifier 410, an integrated controller 420, a reference signal determinator 430, a module communicating unit 440, and a comfort tuning unit 450. It is noted that each of the components included in the chassis control module 400 may be embodied using a microprocessor and a physical data storage storing software instructions that, when executed by the microprocessor, cause the microprocessor to implement various operations as described in the succeeding paragraphs.

The dynamic margin identifier 410 is coupled to the vehicle state sensor 220, and includes a chassis margin estimator 412 and a tire force margin estimator 414. The dynamic margin identifier 410 is further coupled to the decision module 300 for transmitting information thereto.

The integrated controller 420 includes a self-diagnosis unit 422 and a command controller 424.

The reference signal determinator 430 is coupled to the positioning module 210 and the decision module 300, and is configured to receive data therefrom and to process the data. The reference signal determinator 430 is further coupled to the integrated controller 420 for transmitting the processed data thereto. It is noted that the reference signal determinator 430 may be configured to transmit other data (such as an urgency flag) that is known in the related art, and details thereof are omitted herein for the sake of brevity.

The module communicating unit 440 is coupled to the chassis self-inspection module 700, the integrated controller 420 and the decision module 300, and is configured to enable data transmission among the chassis self-inspection module 700, the integrated controller 420 and the decision module 300.

In general, the chassis control module 400 is configured to determine whether the decision command generated by the decision module 300 can be carried out by the dynamic driving system 500 of the autonomous vehicle 100, and to respond based on the determination.

The actuator controller module 600 is coupled to the chassis control module 400 for receiving signals therefrom, and is coupled to the dynamic driving system 500 for actuating the dynamic driving system 500 to move the autonomous vehicle 100 based on the signals.

The chassis self-inspection module 700 is coupled to the dynamic driving system 500 and the sets of sensors of the vehicle state sensor module 220 for performing an inspection operation on various parts of the autonomous vehicle 100 to determine whether the parts of the autonomous vehicle 100 are functioning normally based the data from the sets of sensors. For example, the chassis self-inspection module 700 may determine whether the chassis is functioning normally.

Figure 2A:
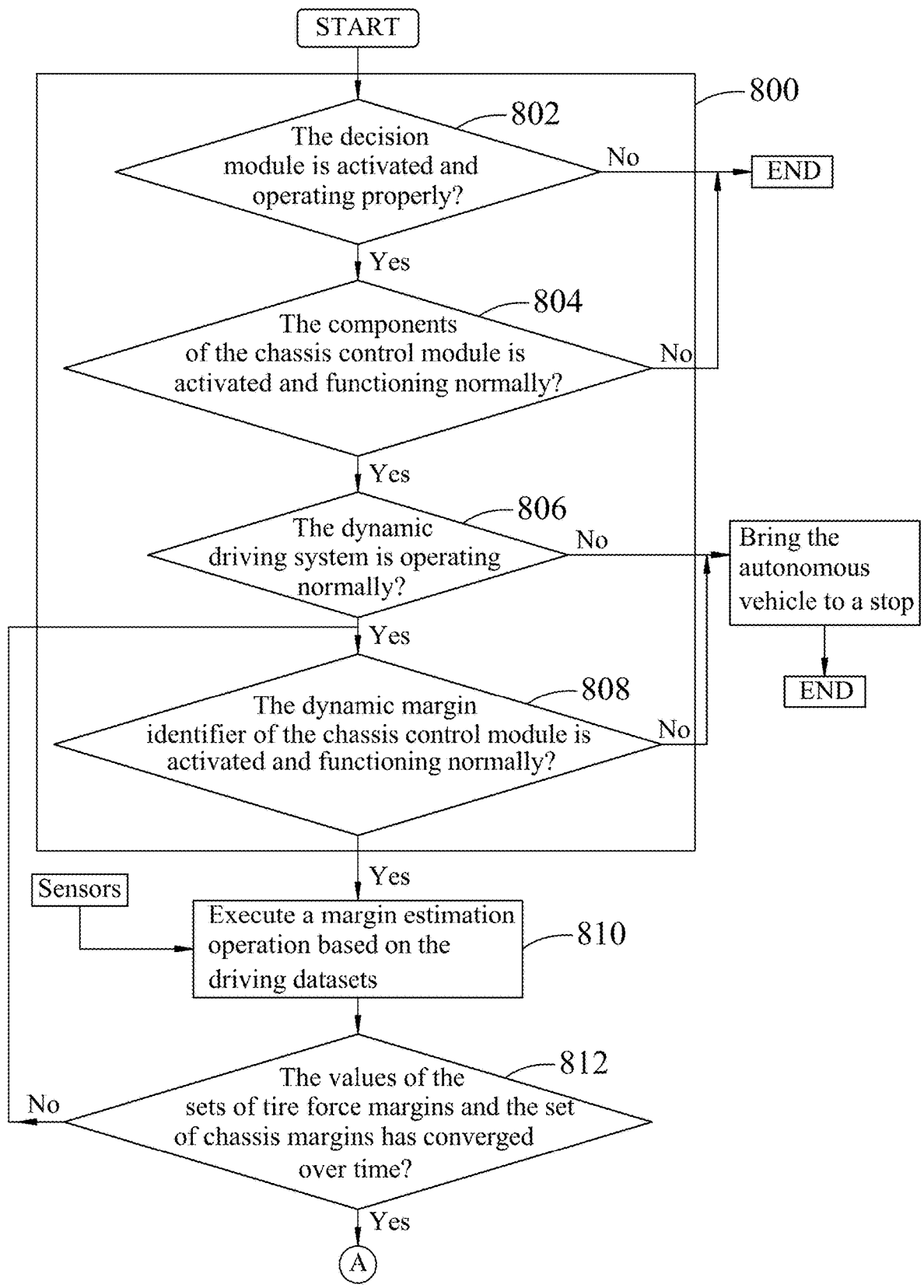
FIGS. 2A to 2C constitute a flow chart illustrating steps of a method for controlling movement of an autonomous vehicle according to one embodiment of the disclosure.
Figure 2B:
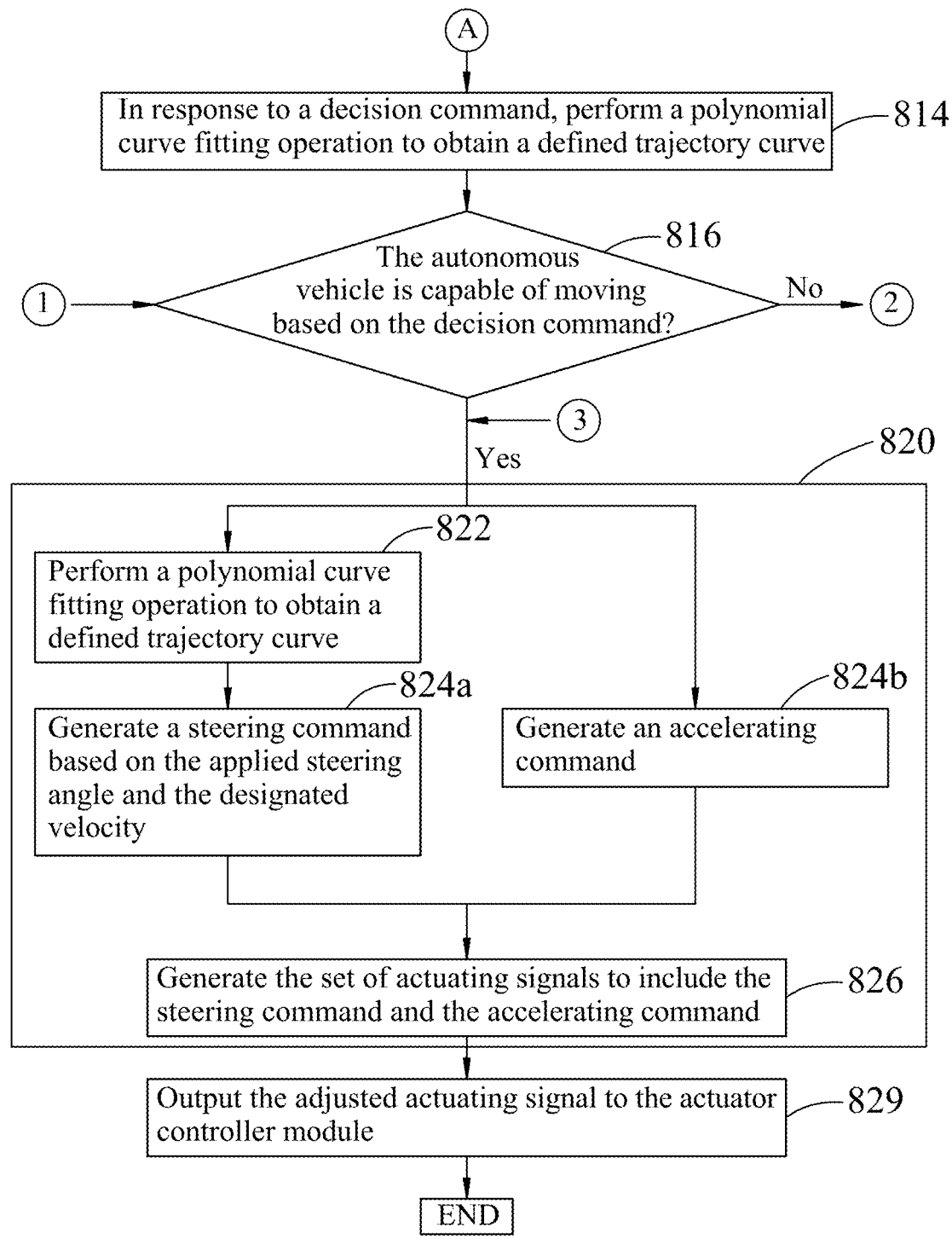
Figure 2C:
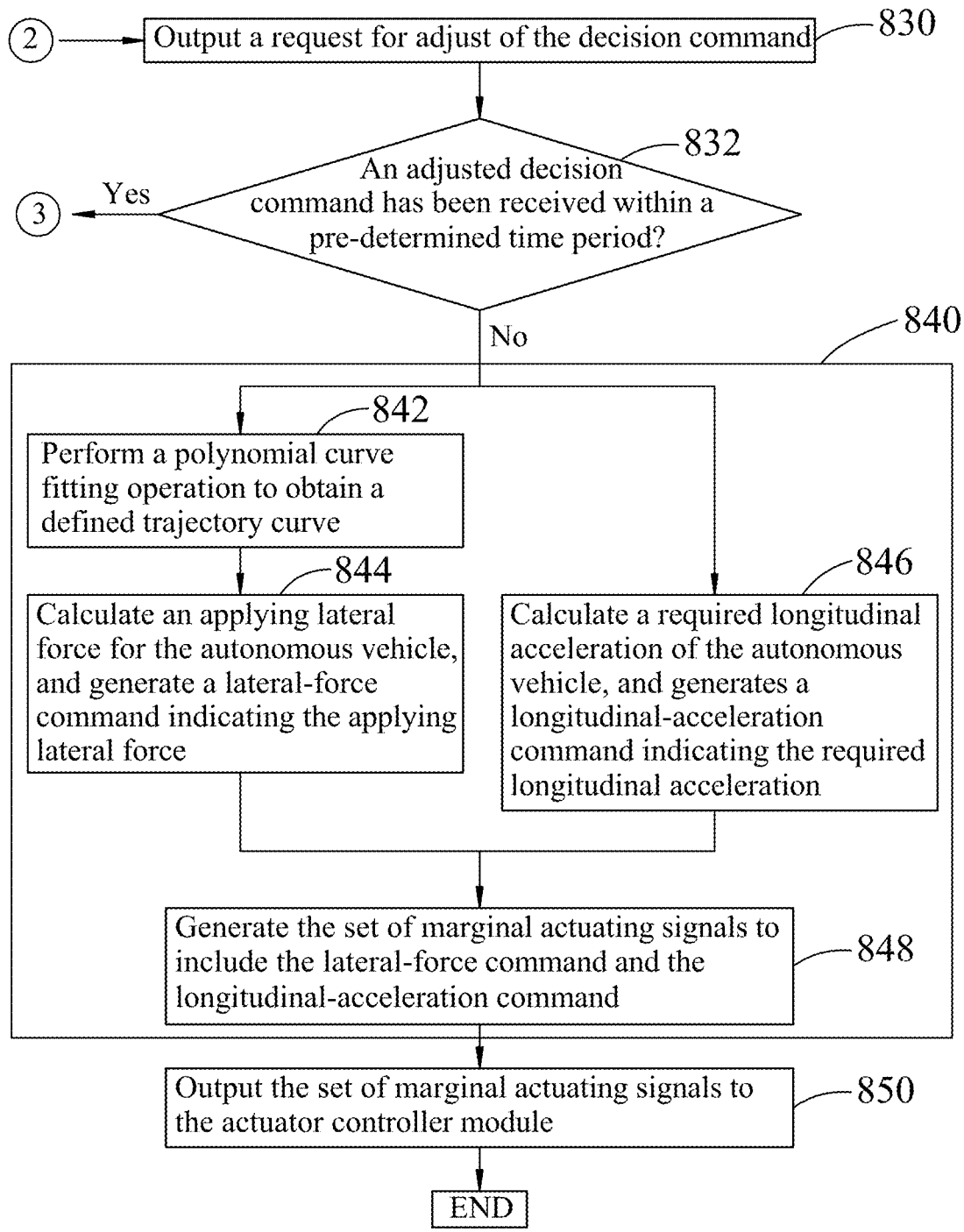

FIGS. 2A to 2C cooperatively form a flow chart illustrating steps of a method for controlling movement of an autonomous vehicle according to one embodiment of the disclosure. It is noted that the method is implemented using the chassis control module 400 that is coupled to the components of the autonomous vehicle 100.

In this embodiment, while the autonomous vehicle 100 is in motion in the autonomous mode, the information platform 200 is configured to detect the driving datasets, and the decision module 300 is configured to generate the decision command.

In step 800, the chassis control module 400 performs a preliminary examination on various components of the dynamic driving system 500 and the chassis control module 400 of the autonomous vehicle 100.

Specifically, in this embodiment, the preliminary examination includes a number of operations, as described in the following sub-steps. It is noted that, in this embodiment, each of the components of the information platform 200, the decision module 300, the chassis control module 400 and the dynamic driving system 500 may be equipped with a self-diagnosis element (not shown) to determine whether the component is functioning properly, and to transmit a status signal and/or a flag to the module communicating unit 440 for indicating whether the component is functioning properly.

In sub-step 802, the self-diagnosis unit 422 of the chassis control module 400 determines whether the decision module 300 is functioning properly. This may be done by the module communicating unit 440 determining whether the status signal and/or the flag has been received from the decision module 300.

When it is determined that the decision module 300 is operating properly, the flow proceeds to sub-step 804. Otherwise, the module communicating unit 440 may generate a message indicating that the autonomous vehicle 100 cannot be operated in the autonomous mode to notify the driver of the situation.

In sub-step 804, the self-diagnosis unit 422 determines whether the components of the chassis control module 400 are activated and functioning normally. This may be done by the module communicating unit 440 obtaining a status signal from each of the components of the chassis control module 400. When it is determined that the chassis control module 400 is activated and functioning normally, the flow proceeds to sub-step 806. Otherwise (i.e., the chassis control module 400 is not activated (inactive state) or does not function normally (abnormal state)), the integrated controller 420 may generate a message indicating that the autonomous vehicle 100 cannot be operated in the autonomous mode to notify the driver of the situation, and the integrated controller 420 may initiate a troubleshooting operation.

In sub-step 806, the integrated controller 420 determines whether the dynamic driving system 500 operates normally. When it is determined based on the data from the chassis self-inspection module 700 that the dynamic driving system 500 operates normally, the flow proceeds to sub-step 808. Otherwise (e.g., the dynamic driving system 500 is in an inactive state or an abnormal state), the integrated controller 420 may generate a message indicating that the autonomous vehicle 100 may not be safe to continue moving so as to notify the driver of the situation, and the command controller 424 may generate a set of stopping actuating signals and output the set of stopping actuating signals to the actuator controller module 600 so as to enable the actuator controller module 600 to stop the autonomous vehicle 100 in a controlled way, such as moving toward a roadside while slowing down to a stop.

In sub-step 808, the integrated controller 420 determines whether the dynamic margin identifier 410 of the chassis control module 400 is activated and functioning normally.

When it is determined based on the data from the chassis control module 400 that the dynamic margin identifier 410 is activated and functioning normally, the flow proceeds to step 810. Otherwise, the integrated controller 420 may generate a message indicating that the autonomous vehicle 100 may not be safe to continue moving to notify the driver of such a situation, and the command controller 424 may generate a set of stopping actuating signals and output the set of stopping actuating signals to the actuator controller module 600 so as to enable the actuator controller module 600 to stop the autonomous vehicle 100 in a controlled way, such as moving toward a roadside while slowing down to a stop.

In step 810, the dynamic margin identifier 410 gathers the driving datasets from the information platform 200 and executes a margin estimation operation based on the driving datasets. Specifically, the margin estimation operation is to first estimate capable performances of the dynamic driving system 500, and then to estimate a set of tire force margins with respect to each of the wheels (one wheel, one set of tire force margins) and a set of dynamic chassis margins based on the driving datasets and the capable performances.

Figure 5:
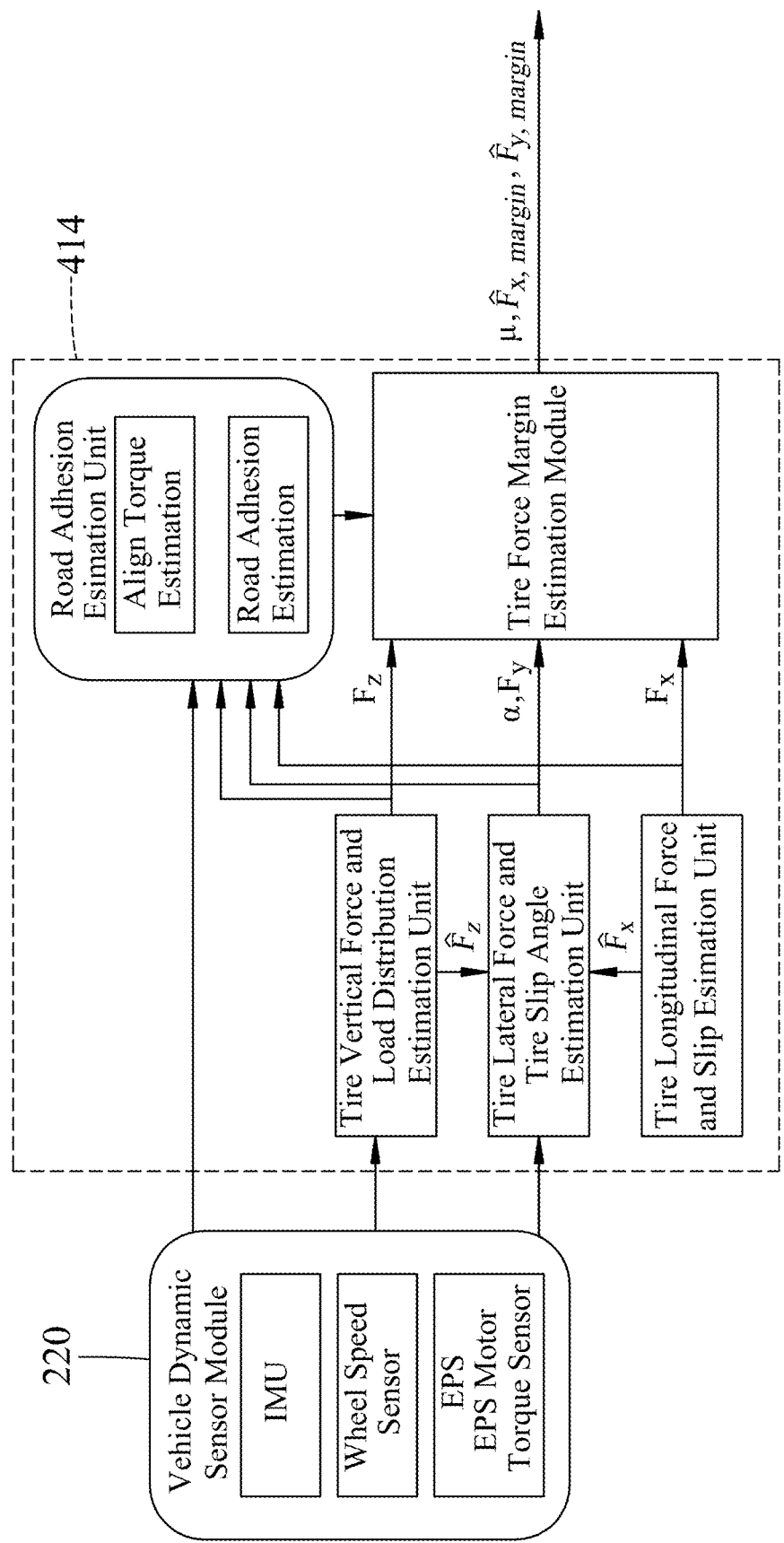
FIG. 5 illustrates operations for estimating a set of tire force margins for a wheel.

For each of the wheels, as shown in FIG. 5, the estimation of the corresponding set of tire force margins can be divided into three stages. In a first stage, based on the driving datasets, the tire force margin estimator 414 of the dynamic margin identifier 410 obtains a wheel vertical force (i.e., the radial force applied on the wheel along a vertical axis) and estimates a load distribution (i.e., a distribution of the wheel vertical force applied on the wheel), obtains a wheel lateral force (i.e., the lateral force applied on the wheel along a lateral axis), a velocity of the autonomous vehicle 100 and a rotational speed of each of the wheels, and estimates a slip angle of the wheel, and obtains a wheel longitudinal force (i.e., the fore-aft force applied on the wheel along a longitudinal axis) and estimates a slip percentage of the wheel (also known as "longitudinal slip").

Afterward, in the second stage, the above datasets and the parameters obtained in the first stage may be used to calculate an aligning torque ($T_{align}$) of the wheel, and to estimate a road adhesion coefficient ($\mu$) based on the aligning torque of the wheel. Additionally, the capable performance of the wheel may be expressed in the form of a maximum force that can be created by the wheel and that is calculated based on the turning angle of the wheel and a contact length between the wheel and the ground.

Then, in the third stage, the tire force margin estimator 414 calculates the set of tire force margins for the wheel based on the driving datasets, the aligning torque and the road adhesion coefficient. The set of tire force margins indicates how much more force can be applied on the wheel (along the longitudinal axis and along the lateral axis) before reaching the capable performance. In this embodiment, the tire force margin estimator 414 may calculate the set of tire force margins using the following equations:

$$\widehat{F_{x,margin}} = \sqrt{(\widehat{\mu_{a,peak}} * \widehat{F_z})^2 - \widehat{F_y}^2}$$

$$\widehat{F_{y,margin}} = \sqrt{(\widehat{\mu_{a,peak}} * \widehat{F_z})^2 - \widehat{F_x}^2}$$

where $\widehat{F_{x,margin}}$ and $\widehat{F_{y,margin}}$ represent components of the set of tire force margins, $\hat{\mu}_{a,peak}$ represents the road adhesion coefficient calculated using a number of parameters included in the driving datasets and the aligning torque, and $\widehat{F_x}^2$, $\widehat{F_y}^2$ and $\widehat{F_z}^2$ represent squared values of forces applied to the tire in different directions, respectively.

The tire force margin estimator 414 then transmits the tire force margins of the wheels to the integrated controller 420, and transmits the road adhesion coefficient and the aligning torque to the chassis margin estimator 412.

Figure 6:
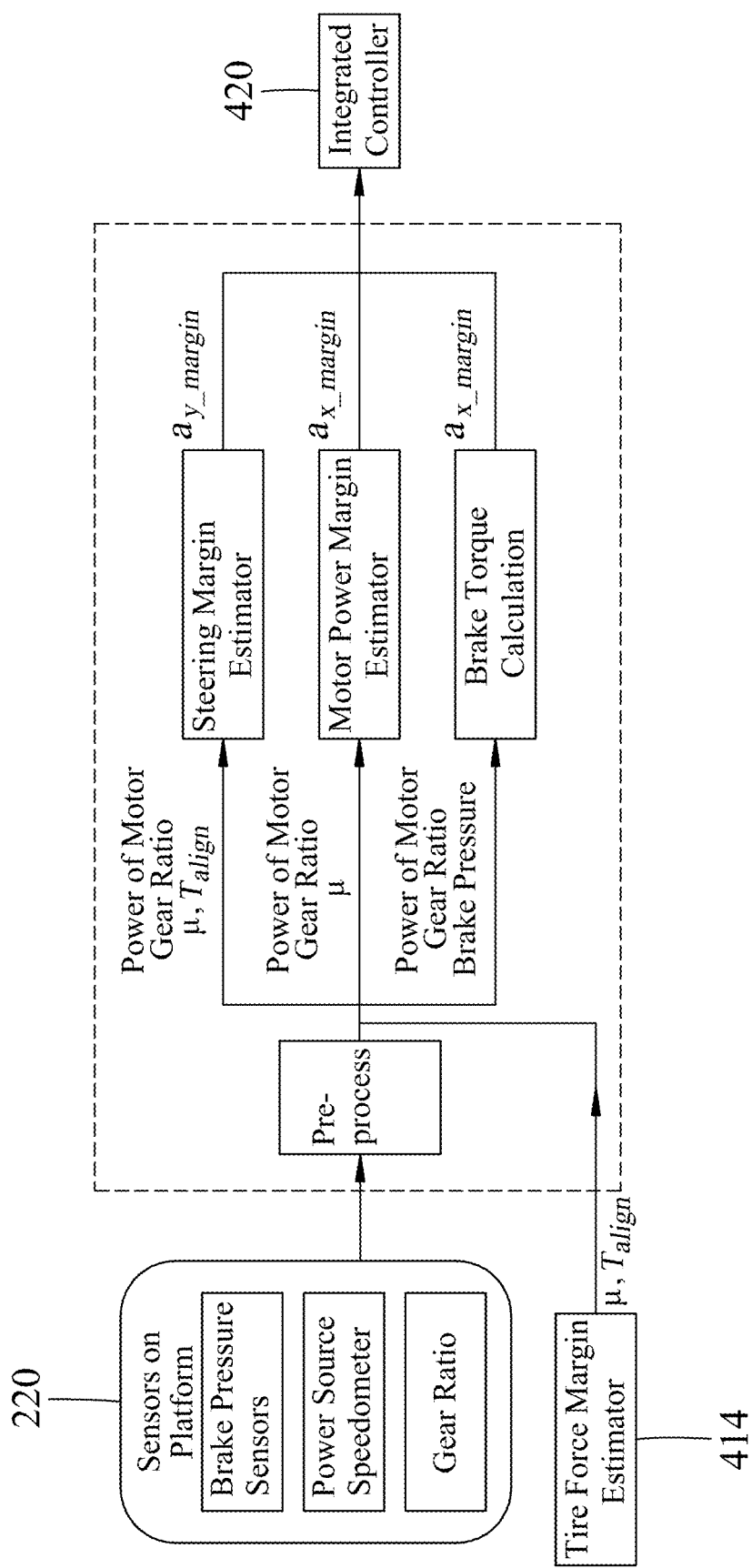
FIG. 6 illustrates operations for estimating a set of dynamic chassis margins.

Regarding the set of dynamic chassis margins, as shown in FIG. 6, the chassis margin estimator 412 of the dynamic margin identifier 410 is configured to obtain the driving datasets from the vehicle state sensor module 220, and to estimate the set of dynamic chassis margins based on the driving datasets. Specifically, the driving datasets may include a pressure applied to the brake pedal (or a brake force), a power outputted by the motor, a velocity of the autonomous vehicle 100, a gear ratio, etc.

In a first stage, the chassis margin estimator 412 performs a pre-process operation on the driving datasets obtained from the vehicle state sensor module 220 in order to filter out potential noises.

In a second stage of this embodiment, the chassis margin estimator 412 estimates the set of dynamic chassis margins including a steering margin subset, a motor power margin subset and a brake torque margin subset. The steering margin subset includes an angular speed margin and a current-torque margin, the motor power margin subset includes a speed margin and an acceleration margin, and the brake torque margin subset includes a pressure margin and a brake force. The current-torque margin may indicate an additional amount of current or torque that can be outputted by the dynamic driving system 500. The components of the set of dynamic chassis margins may be calculated based on the driving datasets obtained by the vehicle state sensor module 220 of the information platform 200, a current road condition of the ground (e.g., wet or dry, indicated by the frictions between the wheels and the ground), physical attributes of the wheels (e.g., an effective radius of the circular frame of each wheel), etc.

It is noted that, generally, calculating the set of dynamic chassis margins involves calculating current values of the relevant components (a current speed, an angular speed of the steering wheel, etc.), and using the current values and the corresponding capable performances to calculate the set of dynamic chassis margins. Other parameters may be also taken into consideration, such as the aligning torque, a friction torque between the ground and the tires, an effective radius of the wheels, etc.

In this embodiment, the chassis margin estimator 412 estimates the steering margin subset based on the power outputted by the motor, the gear ratio, the road adhesion coefficient and the aligning torque, estimates the motor power margin subset based on the power outputted by the motor, the gear ratio and the road adhesion coefficient, and estimates the brake torque margin subset based on the power outputted by the motor, the gear ratio and the pressure applied to the brake.

It is noted that, for each of the steering sub-system, the motor and the brake sub-system, the capable performance may be derived based on a T-N curve of the motor, and the associated margin may be obtained by deducting a current output thereof from the capable performance thereof. Other parameters such as a gear ratio of the motor, a traction of the motor, an electromotive force coefficient, a rotational speed of the motor, an efficiency of the motor, etc., may be employed in deriving the capable performances.

As such, the dynamic margin identifier 410 is configured to calculate a longitudinal acceleration margin based on the motor power margin subset and the brake torque margin subset, and to calculate a lateral acceleration margin based on the steering margin subset.

It is noted that the information platform 200 is configured to obtain the driving datasets continuously, and the dynamic margin identifier 410 is configured to execute the margin estimation operation continuously, and as a result, the sets of tire force margins and the set of dynamic chassis margins may be updated dynamically.

Instep 812, the integrated controller 420 receives the driving datasets from the information platform 200, and determines whether the values of the sets of tire force margins and the set of chassis margins estimated in step 810 have converged over time. Since outputs of the sensors may have deviations inherently when the sensors are first activated and would gradually stabilize over time, the values of the sets of tire force margins and the set of chassis margins estimated in step 810 may be inaccurate at first, and then become more accurate and converge over time. When it is determined that the values of the sets of tire force margins and the set of chassis margins have converged, the flow proceeds to step 814. Otherwise, the flow goes back to step 808.

Figure 4:
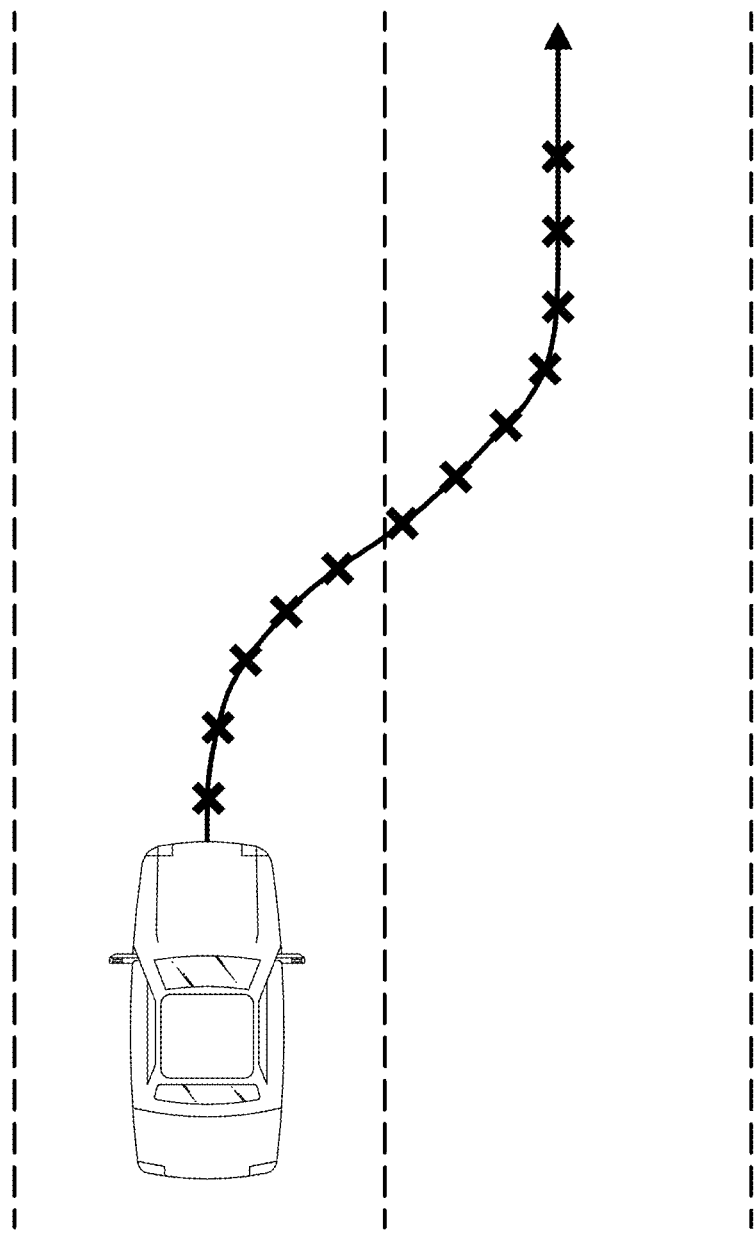
FIG. 4 is a schematic view illustrating a number of waypoints included in a decision command, and a defined trajectory curve that is plotted based on the waypoints.

In step 814, the reference signal determinator 430 receives a decision command from the decision module 300. In this embodiment, the decision command includes a plurality of waypoints and a designated velocity (see FIG. 4, where the X marks represent the waypoints). Each of the waypoints may be in the form of a set of geographic coordinates in the geographic coordinate system (GCS), indicating a specific geographic position. In response to receipt of the waypoints, the reference signal determinator 430 is configured to perform a transforming operation to transform each of the set of geographic coordinates into a set of local coordinates associated with the autonomous vehicle 100, so as to enable subsequent calculations.

Afterward, the reference signal determinator 430 performs a polynomial curve fitting operation on the waypoints to obtain a defined trajectory curve. Specifically, in this embodiment, the polynomial curve fitting operation may be least square fitting, and the defined trajectory curve may be expressed in the form of a third order polynomial, as shown in the following:

$$y = a_0 + a_1 x + a_2 x^2 + a_3 x^3,$$

where x and y are geographic coordinates of a waypoint in the GCS, and $a_0$, $a_1$, $a_2$ and $a_3$ are coefficients obtained by the polynomial curve fitting operation.

The reference signal determinator 430 then transmits the defined trajectory curve to the integrated controller 420.

Then, the integrated controller 420 determines a curvature of the defined trajectory curve and calculates a set of required performances associated with the decision command based on at least the designated velocity and the curvature of the defined trajectory curve. Using the defined trajectory curve, an amount of required lateral movement of the autonomous vehicle 100 and a steering angle of the front wheels may also be derived.

In this embodiment, the set of required performances includes a longitudinal velocity (i.e., the speed of the autonomous vehicle 100 moving forward), and an applied steering angle of the front wheels. The applied steering angle maybe further used to derive an angular displacement of the steering wheel to achieve the applied steering angle of the front wheels.

The set of required performances may indicate a certain amount of steering power in the case that the decision command requires the autonomous vehicle 100 to turn at a relatively higher velocity, a certain amount of increased output of the motor, or a certain amount of increased brake force to be applied to the brake discs, etc. The steering power may be in a form of a current provided to the steering motor for driving the rack to turn the front wheels by the applied steering rate.

In step 816, the self-diagnosis unit 422 of the integrated controller 420 determines whether the autonomous vehicle 100 is capable of moving according to the decision command.

Specifically, in step 816, the determination as to whether the autonomous vehicle 100 is capable of moving according to the decision command is done with respect to a longitudinal direction and a lateral direction. Step 816 includes the following operations.

Firstly, the self-diagnosis unit 422 determines the longitudinal velocity from the designated velocity. Then, the self-diagnosis unit 422 calculates a longitudinal velocity threshold based on the lateral acceleration margin that is most recently calculated and the curvature of the defined trajectory curve. It is noted that, in this embodiment, other parameters such as the friction between the wheels and the ground, and the effective radius of the wheels, may also be employed in the calculation of the longitudinal velocity threshold.

Figure 7:
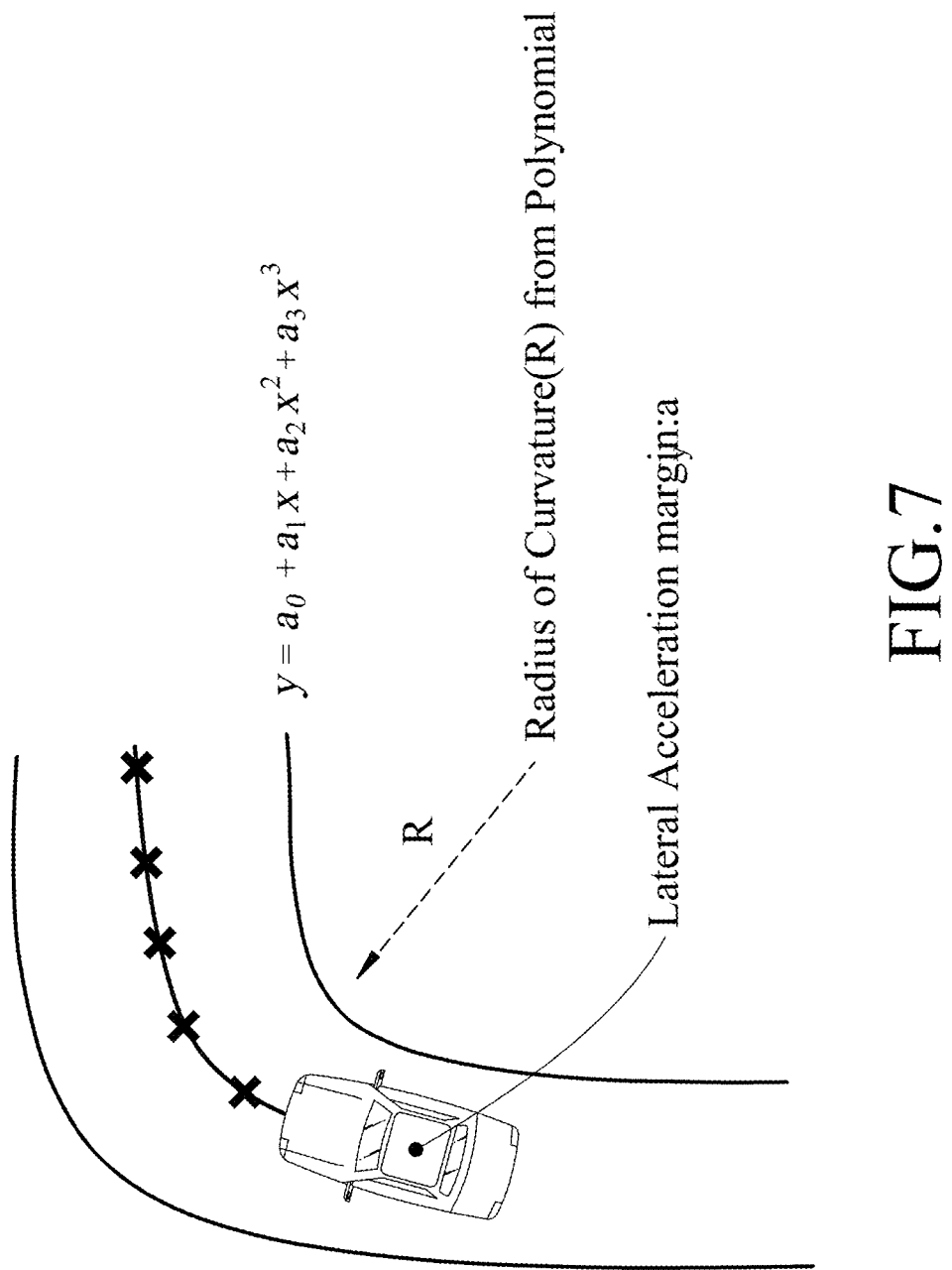
FIG. 7 is a schematic view illustrating a vehicle moving on the defined trajectory curve and the radius of curvature of the defined trajectory curve.

In this embodiment, when a turn is to be involved based on the defined trajectory curve, a curvature will be present (as shown in FIG. 7), and a radius of curvature for the curvature may be derived. In such a case, the longitudinal velocity threshold may be expressed as:

$$V_x = (a_y * R)^{\frac{1}{2}}$$

where $V_x$ represents the longitudinal velocity threshold, $a_y$ represents the lateral acceleration margin, and R represents the radius of curvature for the curvature.

Then, the self-diagnosis unit 422 compares the longitudinal velocity threshold and the longitudinal velocity. When it is determined that the longitudinal velocity threshold is larger than the longitudinal velocity, it may be determined that the autonomous vehicle 100 is capable of moving according to the decision command, and the flow proceeds to step 820. Otherwise, when it is determined that the longitudinal velocity threshold is not larger than the longitudinal velocity, it may be determined that the autonomous vehicle 100 is not capable of moving according to the decision command, and the flow proceeds to step 830.

In step 820, the chassis control module 400 generates a set of actuating signals based on the decision command, and outputs the set of actuating signals to the actuator controller module 600, so as to enable the actuator controller module 600 to actuate the dynamic driving system 500 to move the autonomous vehicle 100 in accordance with the decision command. In some embodiments where the comfort tuning unit 450 is omitted, the command controller 424 transmits the set of actuating signals directly to the actuator controller module 600. In some embodiments where the comfort tuning unit 450 is present, the command controller 424 generates the set of actuating signals with the comfort tuning unit 450. Further referring to FIG. 8, in this embodiment, the operations of step 820 include the following sub-steps.

In sub-step 822, the reference signal determinator 430 of the chassis control module 400 performs a polynomial curve fitting operation on the waypoints to obtain the defined trajectory curve.

In sub-step 824a, the command controller 424 of the chassis control module 400 generates a steering command based on the applied steering angle and the designated velocity. It is noted that, in this embodiment, the command controller 424 calculates the applied steering angle based on the defined trajectory curve, the designated velocity, and other parameters such as a look-ahead deviation, a yaw rate, an Understeer coefficient, a control gain of the steering sub-system, etc.

In sub-step 824b, the command controller 424 inputs the designated velocity into a proportional-integral-derivative (PID) controller (not shown) to obtain an applying acceleration or deceleration ($\theta_{throttle}$ or $\theta_{brake}$) associated with one of the power source controller and the brake sub-system, depending on a relationship between the designated velocity and a current velocity of the autonomous vehicle 100. Then, the command controller 424 generates an accelerating command indicating the applying acceleration. In addition, the command controller 424 calculates a center of percussion (COP) of the autonomous vehicle 100 which may be calculated based on a moment of inertia and a mass of the autonomous vehicle 100, and a length between a back wheel (not shown) to a centroid of the autonomous vehicle 100.

In sub-step 826, the command controller 424 generates the set of actuating signals including the steering command and the accelerating command.

Figure 8:
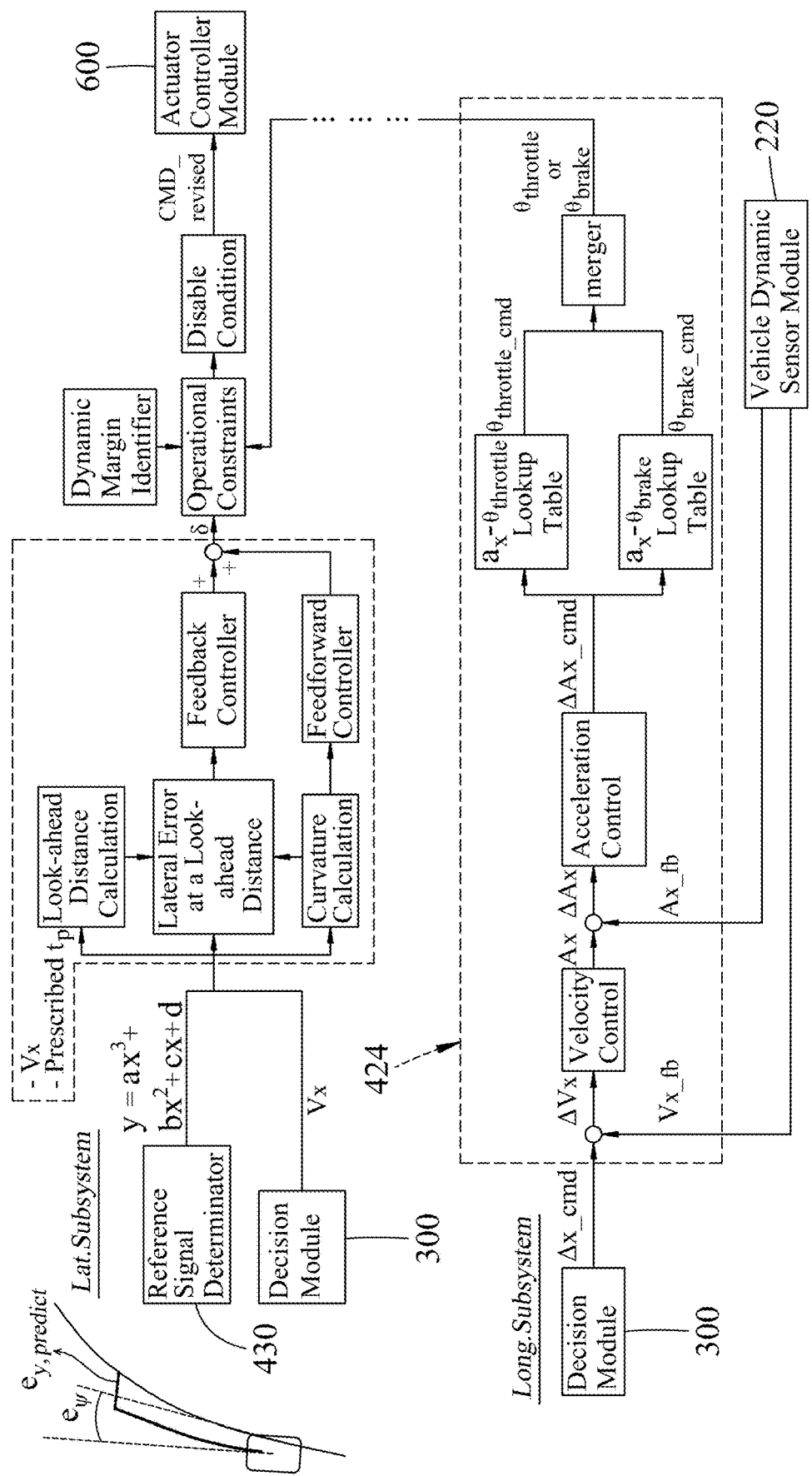
FIG. 8 is a control block diagram illustrating operations for controlling the movement of the autonomous vehicle in a normal mode.
Figure 10:
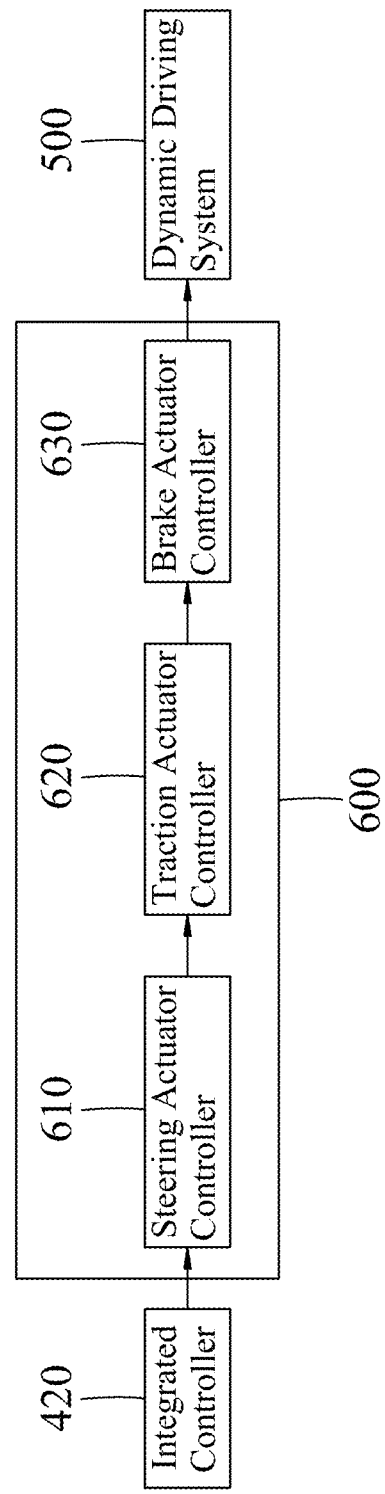
FIGS. 10 to 13 are control block diagrams illustrating control connections and interfaces among components of an actuator controller module according to one embodiment of the disclosure.
Figure 11:
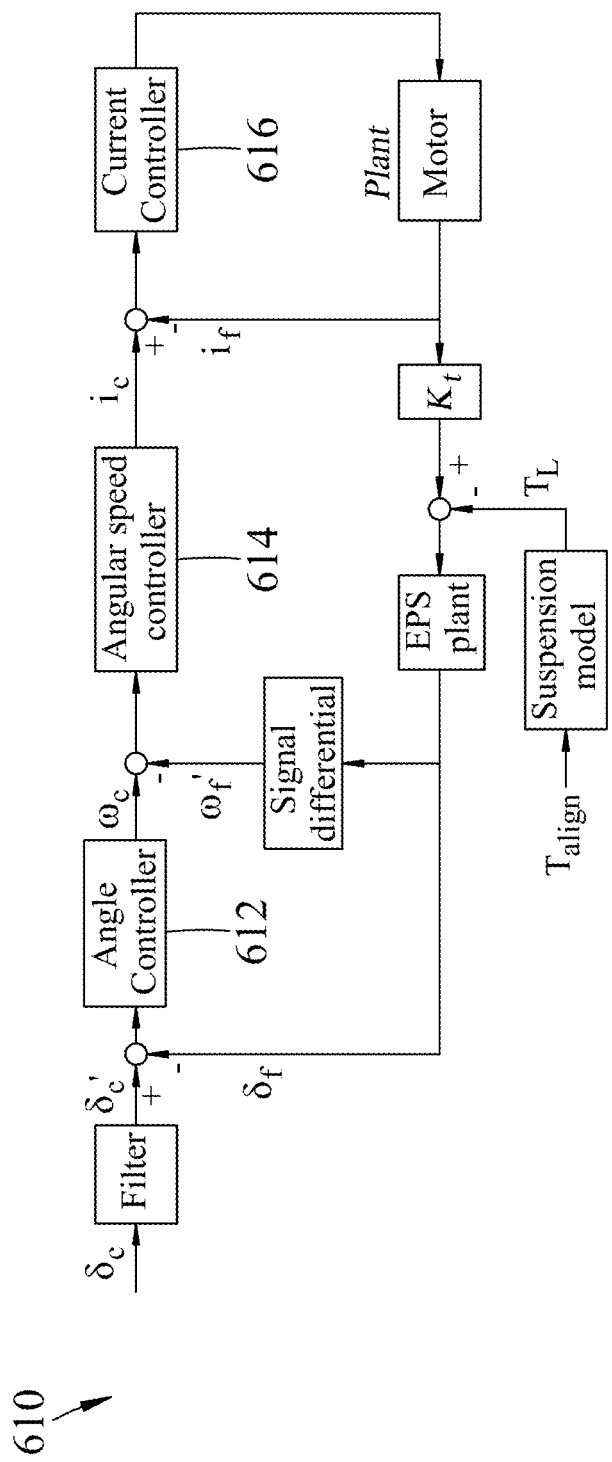
Figure 12:
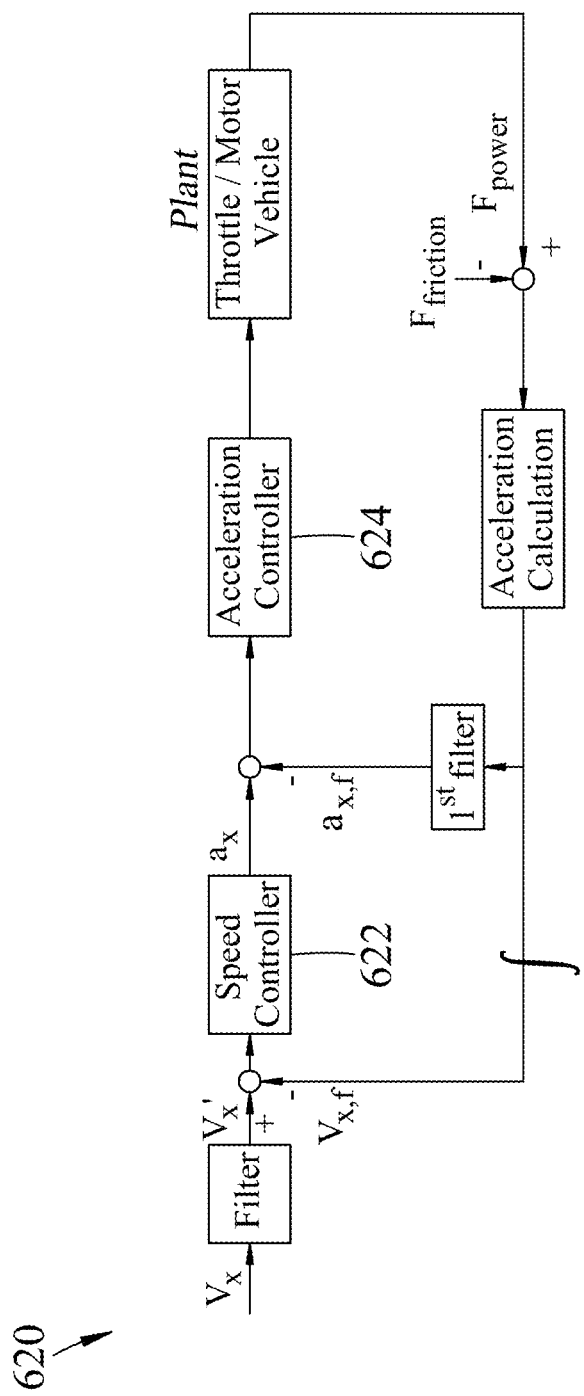
Figure 13:
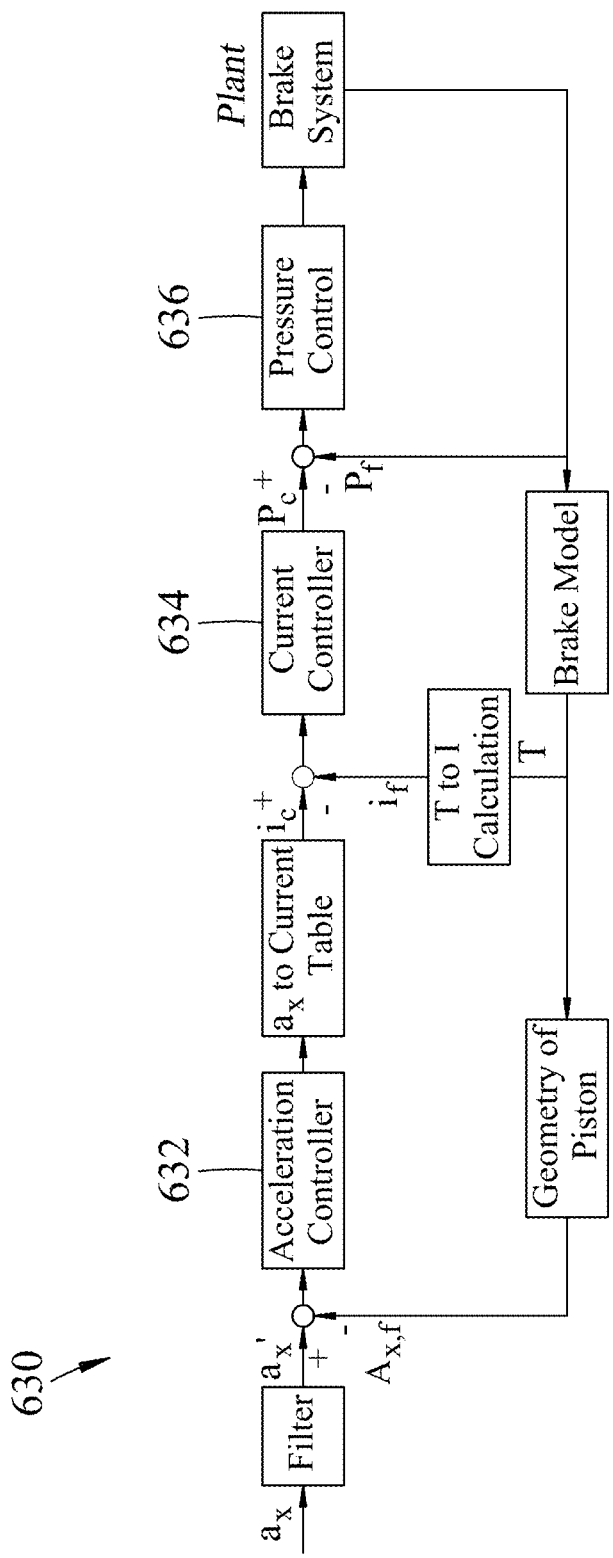

It is noted that in the operations of FIG. 8, other operations that are known in the related art (e.g., look-ahead distance calculation, incorporating lateral error at a look-ahead distance, applying operational constraints, etc.) and parameters associated with the velocity and the acceleration of the autonomous vehicle 100 (e.g., $\Delta x_{cmd}$, $\Delta Vx$,) may be employed in generating the set of actuating signals, the details thereof are omitted herein for the sake of brevity.

It is noted that in the embodiments where the comfort tuning unit 450 is present, in step 820, the comfort tuning unit 450 is programmed to perform a driving comfort adjustment on the set of actuating signals based on an expected vibration on the autonomous vehicle 100 that results from an expected movement of the autonomous vehicle 100 according to the set of actuating signals and that is transferred to people in the autonomous vehicle 100. In this embodiment, the comfort tuning unit 450 may determine whether the expected vibration constitutes whole body vibration (WBV) that may be uncomfortable to the people in the autonomous vehicle 100, as defined in International Organization for Standardization (ISO) 2631-1. In the case that the comfort tuning unit 450 determines that the expected vibration may be uncomfortable to the people in the autonomous vehicle 100, the comfort tuning unit 450 may adjust the set of actuating signals accordingly so as to generate a set of adjusted actuating signals, which serves to reduce the expected vibration.

Afterward, in step 829, the set of actuating signals (or the set of adjusted actuating signals) is outputted to the actuator controller module 600, which in turn controls the components of the dynamic driving system 500 to operate based on the (adjusted) actuating signals, so as to move the autonomous vehicle 100 in accordance with the decision command.

It is noted that the operations of step 820 may be referred to as a "normal mode" since the autonomous vehicle 100 is capable of moving according to the decision command.

On the other hand, in step 830, the command controller 424 outputs a request for adjustment of adjusting the decision command to the decision module 300, via the module communicating unit 440. Specifically, the request for adjustment of the decision command may include the lateral acceleration margin and the longitudinal velocity threshold, so as to request the decision module 300 to generate an adjusted decision command based on the data included in the request for adjustment.

In step 832, the command controller 424 determines whether an adjusted decision command has been received by the chassis control module 400 within a pre-determined time period (e.g., 0.5 seconds) after the request for adjustment of the decision command is outputted.

When it is determined that an adjusted decision command has been received within the pre-determined time period, the flow proceeds to step 820.

Otherwise, when an adjusted decision command has not been received by the chassis control module 400 within the pre-determined time period, the flow proceeds to step 840.

In step 840, the chassis control module 400 calculates a set of marginal actuating signals based on the decision command, the set of dynamic chassis margins, the driving datasets and the COP of the autonomous vehicle 100.

Further referring to FIG. 9, in this embodiment, the operations of step 840 include the following sub-steps.

In sub-step 842, the reference signal determinator 430 of the chassis control module 400 performs a polynomial curve fitting operation on the waypoints of the decision command to obtain the defined trajectory curve.

In sub-step 844, the command controller 424 of the chassis control module 400 calculates an applying lateral force for the autonomous vehicle 100 resulting from the current movement of the autonomous vehicle 100, and generates a lateral-force command indicating the applying lateral force.

Specifically, for each of the wheels, the command controller 424 estimates a required slip angle based on at least the current velocity of the autonomous vehicle 100 and the wheel vertical force applied on the wheel along the vertical axis. It is noted that the term "slip angle" is the angle between the direction in which a wheel is pointing and the direction in which the wheel is actually traveling. It is noted that, a required slip angle indicates a slip angle of the autonomous vehicle 100 that "attempts" to move the autonomous vehicle 100 according to the defined trajectory curve (but cannot move precisely along the defined trajectory curve), and may be achieved by adjusting a longitudinal velocity of the autonomous vehicle 100.

In calculating the required slip angles for the wheels, other data included in the driving datasets may be employed such as a cornering stiffness of the tires, the road adhesion coefficient, etc. The current velocity of the autonomous vehicle 100 may be decomposed into a longitudinal velocity component and a lateral velocity component.

Then, the command controller 424 calculates the applying lateral force for the autonomous vehicle 100 based on the required slip angles of the wheels and the cornering stiffness. The applying lateral force indicates, based on the required slip angles of the wheels and the current velocity of the autonomous vehicle 100, what amount of lateral force is needed for the autonomous vehicle 100 to move along the defined trajectory curve.

In sub-step 846, the command controller 424 calculates a required longitudinal acceleration of the autonomous vehicle 100, and generates a longitudinal-acceleration command indicating the required longitudinal acceleration.

Specifically, the command controller 424 calculates a distance between the COP of the autonomous vehicle 100 and the defined trajectory curve. The distance may include a longitudinal component and a lateral component.

Then, the command controller 424 calculates the required longitudinal acceleration based on the distance, the applying lateral force and the curvature of the defined trajectory curve. It is noted that in calculating the required longitudinal acceleration, other parameters may be taken into consideration, such as an arc length of the defined trajectory curve, a damping and a natural frequency of a velocity control subsystem in the autonomous vehicle 100 (not depicted in the drawings).

In sub-step 848, the command controller 424 generates the set of marginal actuating signals by performing calculation. The set of marginal actuating signals includes the lateral-force command and the longitudinal-acceleration command.

In step 850, the command controller 424 outputs the set of marginal actuating signals to the actuator controller module 600 so as to enable the actuator controller module 600 to control the components of the dynamic driving system 500 to move the autonomous vehicle 100 based on the marginal actuating signals.

It is noted that the operations of step 840 may be referred to as a "marginal mode" since the autonomous vehicle 100 is not capable of moving based on the decision command (e.g., the decision command indicates an abrupt turn exceeding the capability of the autonomous vehicle 100, or the ground is slippery and limits the capability of the autonomous vehicle 100, etc.), and has to be controlled to operate within the limitations of the autonomous vehicle 100. As seen in FIG. 9, the set of marginal actuating signals may cause the autonomous vehicle 100 to "attempt" to move along a path that is originally planned by the decision module 300.

Referring to FIGS. 10 to 13, in one embodiment, the actuator controller module 600 includes a steering actuator controller 610, a traction actuator controller 620 and a brake actuator controller 630. Each of the steering actuator controller 610, the traction actuator controller 620 and the brake actuator controller 630 may use a feedback loop control system structure. The steering actuator controller 610, the traction actuator controller 620 and the brake actuator controller 630 may be configured to control the steering controller of the steering sub-system, the motor controller of the power source controller, and the braking controller of the brake sub-system, respectively.

The steering actuator controller 610 includes an angle controller 612, an angular speed controller 614 and a current controller 616. Each of the angle controller 612, the angular speed controller 614, and the current controller is configured to receive the set of actuating signals (or the set of adjusted actuating signals) and convert these signals into a respective one of a turning angle of the steering wheel of the steering sub-system, an angular speed for the steering wheel, and an electrical current, and to output the same to the steering motor for driving the rack indicated by the set of actuating signals, respectively.

It is noted that other parameters (e.g., parts of the set of actuating signals obtained from the decision command (such as δc, ωc, and $i_c$), a number of feedback signal resulting from the parts of the set of actuating signals (such as δf, ωf, and $i_f$), a motor torque coefficient ($K_t$), a torque loss ($T_L$), the alignment torque, etc.) may be incorporated in the operation of the steering actuator controller 610.

In this manner, since the steering actuator controller 610 includes a plurality of controllers that are capable to generating various forms of signals for different kinds of vehicles with different kinds of steering actuators, the steering actuator controller 610 of the actuator controller module 600 may be used on various kinds of the autonomous vehicle 100 that employ different kinds of steering sub-systems.

The traction actuator controller 620 includes a speed controller 622 and an acceleration controller 624. Each of the speed controller 622 and the acceleration controller 624 is configured to receive the set of actuating signals and convert the set of actuating signals into a speed of the autonomous vehicle 100, or an acceleration of the autonomous vehicle 100 as indicated by the set of actuating signals.

It is noted that other parameters (e.g., parts of the set of actuating signals obtained from the decision command (such as Vx and $a_x$), a number of feedback signal resulting from the parts of the set of actuating signals (such as Vx, f and $a_{x,f}$), a friction ($F_{friction}$) and a power source output torque ($F_{power}$), etc.) maybe incorporated in the operation of the traction actuator controller 620.

In this manner, since the traction actuator controller 620 includes a plurality of controllers that are capable of generating various forms of signals for different kinds of vehicles with different kinds of power source actuators, the traction actuator controller 620 of the actuator controller module 600 maybe used on various kinds of the autonomous vehicles that employ different kinds of power source controllers.

The brake actuator controller 630 includes an acceleration controller 632, a current controller 634, and a pressure controller 636. Each of the acceleration controller 632, the current controller 634, and the pressure controller 636 is configured to receive the set of actuating signals and convert the set of actuating signals into a respective one of an acceleration of power source controller, an electrical current for controlling the brake sub-system to decelerate by an amount indicated by the set of actuating signals, and a pressure to be applied on the brake pedal.

It is noted that other parameters (e.g., parts of the set of actuating signals obtained from the decision command (such as $a_x$ and $i_c$), a number of feedback signal resulting from the parts of the set of actuating signals (such as Vx, f and $a_{x,f}$), a number of feedback signal from the set of actuating signals, another friction ($P_c$), another power source output torque ($P_f$), a braking torque (T), etc.) may be incorporated in the operation of the brake actuator controller 630.

In this manner, the brake actuator controller 630 of the actuator controller module 600 may be used on various kinds of the autonomous vehicles that employ different kinds of brake sub-systems.

It is noted that the actuator controller module 600 may serve as a multi-purpose interface between the chassis control module 400 and the dynamic driving system 500, such that the chassis control module 400 and the actuator controller module 600 may be configured to serve as an add-on to existing autonomous vehicles with relative ease.

To sum up, the embodiments of the disclosure provide a method and a chassis control module to control movement of an autonomous vehicle. In the embodiments, the chassis control module 400 is configured to obtain the driving datasets from the information platform 200, to perform the margin estimation to determine the sets of tire force margins and the set of dynamic chassis margins, and in response to the receipt of a decision command, determine whether the autonomous vehicle 100 is capable of moving in accordance with the decision command. When it is determined that the autonomous vehicle 100 is capable of moving in accordance with the decision command, the chassis control module 400 operates in a normal mode, in which the chassis control module 400 generates a set of actuating signals based on the decision command. Otherwise, the chassis control module 400 is configured to notify the decision module 300 that the decision command needs to be updated. When no updated decision command is received from the decision module 300, the chassis control module 400 operates in a marginal mode, in which the chassis control module 400 generates a set of marginal actuating signals based on the decision command, the sets of tire force margins, the set of dynamic chassis margins, the required slip angle of the wheels and the COP of the autonomous vehicle 100. Afterward, the chassis control module 400 outputs the set of actuating signals or the set of marginal actuating signals to the actuator controller module 600 so as to enable the actuator controller module 600 to actuate the dynamic driving system 500 to move the autonomous vehicle 100 based on the received signals. In this configuration, the embodiments of the disclosure may be employed in a more advanced autonomous vehicle (e.g., supporting SAE levels 4 and 5 operations) to make sure that the movement of the advanced autonomous vehicle is not only based on the environment in which the advanced autonomous vehicle is moving, but also based on the capabilities of the advanced autonomous vehicle, especially the capabilities of the chassis module of the advanced autonomous vehicle.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling movement of an autonomous vehicle, the autonomous vehicle including a chassis, a dynamic driving system, an information platform, a decision module, a chassis control module and an actuator controller module, the dynamic driving system including a plurality of wheels, a motor, a steering sub-system, a power source controller and a brake sub-system that are mounted on the chassis of the autonomous vehicle, the information platform including multiple sets of sensors with each set of sensors being disposed on a respective one of different parts of the autonomous vehicle where the different parts including the wheels, the sets of sensors being configured to obtain a plurality of driving datasets while the autonomous vehicle is moving, the decision module being configured to compute and generate a decision command for steering the autonomous vehicle, the chassis control module being coupled to the information platform and the decision module, the actuator controller module being coupled to the chassis control module and the dynamic driving system, the method comprising steps of:

a) executing, by the chassis control module, a margin estimation operation to estimate a set of tire force margins with respect to each of the wheels, a set of dynamic chassis margins based on the plurality of driving datasets, and a set of capable performances of the dynamic driving system;
   b) in response to receipt of a decision command from the decision module, calculating, by the chassis control module, a set of required performances associated with the decision command and determining whether the autonomous vehicle is capable of moving in accordance with the decision command;
   c) when it is determined that the autonomous vehicle is capable of moving based on the decision command, by the chassis control module, calculating a set of actuating signals based on the decision command, and outputting the set of actuating signals to the actuator controller module so as to enable the actuator controller module to actuate the dynamic driving system to move the autonomous vehicle in accordance with the decision command;
   d) when it is determined that the autonomous vehicle is not capable of moving in accordance with the decision command, outputting, by the chassis control module, a request for adjustment of the decision command to the decision module; and
   e) when an adjusted decision command has not been received by the chassis control module within a pre-determined time period after step d), by the chassis control module, estimating a required slip angle for each of the wheels, and calculating a set of marginal actuating signals based on the sets of tire force margins for the wheels, the set of dynamic chassis margins, the required slip angle for each of the wheels and a center of percussion (COP) of the autonomous vehicle, and outputting the set of marginal actuating signals to the actuator controller module so as to enable the actuator controller module to actuate the dynamic driving system to move the autonomous vehicle in accordance with the marginal actuating signals.

2. The method of claim 1, further comprising:
   performing, by the chassis control module, a preliminary examination on the dynamic driving system and on the chassis control module; and
   when the preliminary examination indicates that one of the dynamic driving system and the chassis control module is in one of an inactivated state and an abnormal state, generating a stopping actuating signal and outputting the stopping actuating signal to the actuator controller module so as to enable the actuator controller module to actuate the dynamic driving system to stop the autonomous vehicle.

3. The method of claim 1, wherein, when an adjusted decision command is received by the chassis control module within the pre-determined time period after step d), the chassis control module is programmed to repeat step c) with respect to the adjusted decision command.

4. The method of claim 1, wherein in step a):
the plurality of driving datasets used for calculating the sets of tire force margins respectively for the wheels include, for each of the wheels, a number of forces applied on the wheel along a vertical axis, a longitudinal axis and a lateral axis, respectively;
the chassis control module further calculates an aligning torque based on the plurality of driving datasets, and calculates a road adhesion coefficient based on the aligning torque; and
the chassis control module calculates the sets of tire force margins further based on the aligning torque and the road adhesion coefficient.

5. The method of claim 4, wherein in step a), the set of dynamic chassis margins includes:
a steering margin subset including an angular speed margin and a current-torque margin;
a motor power margin subset including a speed margin and an acceleration margin; and
a brake torque margin subset including a pressure margin and a brake force.

6. The method of claim 5, the decision command including a plurality of waypoints and a designated velocity, wherein step b) includes:
performing a polynomial curve fitting operation on the waypoints to obtain a defined trajectory curve;
determining a curvature of the defined trajectory curve; and
calculating the set of required performances based on at least the designated velocity and the curvature of the defined trajectory curve.

7. The method of claim 6, the set of required performances including a longitudinal velocity, wherein, in step b), determining whether the autonomous vehicle is capable of moving in accordance with the decision command includes:
determining the longitudinal velocity from the designated velocity;
calculating a lateral acceleration margin based on the steering margin subset and the motor power margin subset;
calculating a longitudinal velocity threshold based on the lateral acceleration margin that is currently calculated and the curvature of the defined trajectory curve; and
comparing the longitudinal velocity threshold and the longitudinal velocity.

8. The method of claim 6, the set of required performances including an applied steering angle, wherein step c) includes:
generating a steering command based on the applied steering angle and the designated velocity;
inputting the designated velocity into a proportional-integral-derivative (PID) controller to obtain an applying acceleration associated with one of the power source controller and the brake sub-system, and generating an accelerating command indicating the applying acceleration; and
generating the set of actuating signals, the set of actuating signals including the steering command and the accelerating command.

9. The method of claim 6, wherein step e) includes:
estimating, for each of the wheels, the required slip angle for the wheel based on at least a current velocity of the autonomous vehicle and the force applied on the wheel along the vertical axis; and
calculating the set of marginal actuating signals by calculating an applying lateral force for the autonomous vehicle based on at least the required slip angles for the wheels, and generating a lateral-force command indicating the applying lateral force,
calculating a distance between the COP of the autonomous vehicle and the defined trajectory curve,
calculating a required longitudinal acceleration of the autonomous vehicle based on the distance, the applying lateral force and the curvature of the defined trajectory curve, and generating a longitudinal-acceleration command indicating the required longitudinal acceleration, and
generating the set of marginal actuating signals to include the lateral-force command and the longitudinal-acceleration command.

10. The method of claim 1, wherein the calculating the set of actuating signals in step c) includes performing a driving comfort adjustment on the set of actuating signals, based on an expected vibration resulting from an expected movement of the autonomous vehicle according to the set of actuating signals.

11. A chassis control module for controlling a movement of an autonomous vehicle, the autonomous vehicle including a chassis, a dynamic driving system, an information platform, a decision module, the chassis control module and an actuator controller module, the dynamic driving system including a plurality of wheels, a motor, a steering sub-system, a power source controller and a brake sub-system that are mounted on the chassis of the autonomous vehicle, the information platform including for each of the wheels and different parts of the autonomous vehicle, a set of sensors disposed thereon, the sets of sensors being configured to obtain a plurality of driving datasets while the autonomous vehicle is moving, the decision module being configured to compute and generate a decision command for steering the autonomous vehicle, the chassis control module being coupled to the information platform and the decision module, the actuator controller module being coupled to the chassis control module and the dynamic driving system, said chassis control module comprising:
a dynamic margin identifier programmed to, in response to receipt of the plurality of driving datasets obtained by the information platform while the autonomous vehicle is moving, execute a margin estimation operation to estimate a set of tire force margins with respect to each of the wheels and a set of dynamic chassis margins based on the plurality of driving datasets, and a set of capable performances of the dynamic driving system; and
an integrated controller connected to said dynamic margin identifier and programmed to
in response to receipt of the decision command from the decision module, calculate a set of required performances associated with the decision command and determine whether the autonomous vehicle is capable of moving in accordance with the decision command,
when it is determined that the autonomous vehicle is capable of moving in accordance with the decision command, calculate a set of actuating signals based on the decision command, and output the set of actuating signals to the actuator controller module so as to enable the actuator controller module to actuate the dynamic driving system to move the autonomous vehicle in accordance with the decision command,
when it is determined that the autonomous vehicle is not capable of moving in accordance with the decision command, output a request for update of the decision command to the decision module, and when an updated decision command has not been received by said integrated controller after a pre-determined time period has elapsed since the request was outputted, estimate a required slip angle for each of the wheels, and calculate a set of marginal actuating signals based on the decision command, the set of dynamic chassis margins, the required slip angles respectively for the wheels and a center of percussion (COP) of the autonomous vehicle, and to output the set of marginal actuating signals to the actuator controller module so as to enable the actuator controller module to actuate the dynamic driving system to move the autonomous vehicle based on the marginal actuating signals.

12. The chassis control module of claim 11, the autonomous vehicle further including a chassis self-inspection module, the chassis control module further comprising a system diagnostic unit that is connected to the chassis self-inspection module and that is programmed to execute a preliminary examination on the dynamic driving system and the chassis control module, wherein, when the preliminary examination indicates that one of the dynamic driving system and the chassis control module is in one of an inactivated state and an abnormal state, said system diagnostic unit is programmed to control said integrated controller to generate a stopping actuating signal and to output the stopping actuating signal to the actuator controller module so as to enable the actuator controller module to actuate the dynamic driving system to stop the autonomous vehicle.

13. The chassis control module of claim 11, wherein, when an adjusted decision command is received by said integrated controller within the pre-determined time period after the request was outputted, said integrated controller is programmed to calculate an adjusted set of required performances and to determine whether the autonomous vehicle is capable of moving in accordance with the adjusted decision command.

14. The chassis control module of claim 11, wherein:
the plurality of driving datasets used by said dynamic margin identifier to calculate the sets of tire force margins includes, for each of the wheels, a number of forces applied on the wheel along a vertical axis, a longitudinal axis and a lateral axis, respectively;
said dynamic margin identifier further calculates an aligning torque based on the plurality of driving datasets, and a road adhesion coefficient based on the aligning torque; and
said dynamic margin identifier is programmed to calculate the sets of tire force margins further based on the alignment torque and the road adhesion coefficient.

15. The chassis control module of claim 14, wherein the set of dynamic chassis margins calculated by said dynamic margin identifier includes:
a steering margin subset including an angular speed margin and a current-torque margin;
a motor power margin subset including a speed margin and an acceleration margin; and
a brake torque margin subset including a pressure margin and a brake force.

16. The chassis control module of claim 15, the decision command including a plurality of waypoints and a designated velocity, wherein said integrated controller is programmed to determine whether the autonomous vehicle is capable of moving in accordance with the decision command by:

performing a polynomial curve fitting operation on the waypoints to obtain a defined trajectory curve;
determining a curvature of the defined trajectory curve; and
calculating the set of required performances based on at least the designated velocity and the curvature of the defined trajectory curve.

17. The chassis control module of claim 16, the set of required performances including a longitudinal velocity, wherein said integrated controller is programmed to determine whether the autonomous vehicle is capable of moving in accordance with the decision command by:
determining the longitudinal velocity from the designated velocity;
calculating a lateral acceleration margin based on the steering margin subset and the motor power margin subset;
calculating a longitudinal velocity threshold based on the lateral acceleration margin and the curvature of the defined trajectory curve; and
comparing the longitudinal velocity threshold and the longitudinal velocity.

18. The chassis control module of claim 16, the set of required performances including an applied steering angle, wherein said integrated controller is programmed to calculate the set of actuating signals by:
generating a steering command based on the applied steering angle and the designated velocity;
inputting the designated velocity into a proportional-integral-derivative (PID) controller to obtain an applying acceleration associated with one of the power source controller and the brake system, and generating an accelerating command indicating the applying acceleration; and
generating the set of actuating signals to include the steering command and the accelerating command.

19. The chassis control module of claim 16, wherein:
said integrated controller is programmed to estimate, with respect to each of the wheels, the required slip angle for the wheel based on at least a current velocity of the autonomous vehicle and the force applied on the wheel along the vertical axis; and
said integrated controller is programmed to calculate the set of marginal actuating signals by
calculating an applying lateral force for the autonomous vehicle based on the required slip angles for the wheels, and generating a lateral-force command indicating the applying lateral force,
calculating a distance between the COP of the autonomous vehicle and the defined trajectory curve;
calculating a required longitudinal acceleration of the autonomous vehicle based on the distance, the applying lateral force and the curvature of the defined trajectory curve, and generating a longitudinal-acceleration command indicating the required longitudinal acceleration, and
generating the set of marginal actuating signals to include the lateral-force command and the longitudinal-acceleration command.

20. The chassis control module of claim 11, further comprising a tuning unit connected between said integrated controller and the actuator controller module, and programmed to, in response to receipt of the set of actuating signals from said integrated controller, perform a driving comfort adjustment on the set of actuating signals, based on an expected vibration resulting from the set of actuating signals, so as to generate a set of adjusted actuating signals, and to output the adjusted actuating signals to the actuator controller module.

\* \* \* \* \*